United States Patent
Mahdavikhah et al.

(10) Patent No.: US 9,819,283 B2
(45) Date of Patent: Nov. 14, 2017

(54) SYSTEM AND METHOD FOR REGULATION OF MULTI-LEVEL BOOST BASED RECTIFIERS WITH POWER FACTOR CORRECTION

(71) Applicant: ZENTRUM MIKROELEKTRONIK DRESDEN AG, Dresden (DE)

(72) Inventors: Behzad Mahdavikhah, Toronto (CA); Aleksandar Prodic, Toronto (CA)

(73) Assignee: IDT Europe GmbH, Dresden (DE)

( * ) Notice: Subject to any disclaimer, the term of this patent is extended or adjusted under 35 U.S.C. 154(b) by 0 days.

(21) Appl. No.: 14/784,968

(22) PCT Filed: Apr. 22, 2014

(86) PCT No.: PCT/EP2014/058117
§ 371 (c)(1),
(2) Date: Oct. 16, 2015

(87) PCT Pub. No.: WO2014/170501
PCT Pub. Date: Oct. 23, 2014

(65) Prior Publication Data
US 2016/0094142 A1  Mar. 31, 2016

Related U.S. Application Data

(60) Provisional application No. 61/813,951, filed on Apr. 19, 2013.

(51) Int. Cl.
*H02M 7/15* (2006.01)
*H02M 7/04* (2006.01)
(Continued)

(52) U.S. Cl.
CPC ............... *H02M 7/04* (2013.01); *H02M 1/12* (2013.01); *H02M 1/4225* (2013.01);
(Continued)

(58) Field of Classification Search
CPC ............ H02M 1/4208; H02M 1/4225; H02M 3/33592; H02M 7/217; H02M 1/081
(Continued)

(56) References Cited

U.S. PATENT DOCUMENTS

| 5,956,243 | A | | 9/1999 | Mao |
| 6,127,743 | A | * | 10/2000 | Levin .................. H02J 3/01 |
| | | | | 307/105 |
| 2011/0248812 | A1 | | 10/2011 | Hu et al. |

FOREIGN PATENT DOCUMENTS

| CH | 696572 A5 | * | 7/2007 |
| CH | 696572 A5 | | 7/2007 |

(Continued)

OTHER PUBLICATIONS

International Search Report for International Application No. PCT/EP2014/058117, dated Mar. 4, 2014.

*Primary Examiner* — Adolf Berhane
*Assistant Examiner* — Afework Demisse
(74) *Attorney, Agent, or Firm* — Heslin Rotherberg Farley & Mesiti, P.C.

(57) ABSTRACT

A control method and system are provided for regulating operation of power factor correction rectifiers based on the non-symmetric boost converter topology. Control of both the front-end stage is enabled taking sinusoidal current from the utility network and a downstream converter providing isolated DC output voltage. Also provided are a method and system for reducing volume of reactive components in boost-based rectifiers with power factor correction. Flux density through the inductor is reduced with a biasing inductor current having a much lower frequency than the switching frequency of the converter.

7 Claims, 27 Drawing Sheets

(51) Int. Cl.
*H02M 1/42* (2007.01)
*H02M 1/12* (2006.01)
*H02M 3/158* (2006.01)

(52) U.S. Cl.
CPC ............ *H02M 3/158* (2013.01); *Y02B 70/126* (2013.01); *Y02P 80/112* (2015.11)

(58) Field of Classification Search
USPC .......................................... 363/89, 125, 126
See application file for complete search history.

(56) References Cited

FOREIGN PATENT DOCUMENTS

| | | | |
|---|---|---|---|
| CN | 101764529 A | 6/2010 | |
| CN | 102751857 A | 10/2012 | |

\* cited by examiner

| Mode | Mode '1' | | Mode '2' | | Mode '3' | |
| --- | --- | --- | --- | --- | --- | --- |
| Inductor state | Charge | Dis-Charge | Charge | Dis-Charge | Charge | Dis-Charge |
| Conduction path (NSMB) | $L/3, SW_1, SW_2$ | $L/3, SW_1, D_2$ | $L/3, SW_1, D_2$ | $L/3, D_1, SW_2$ | $L/3, D_1, SW_2$ | $L/3, D_1, D_2$ |
| Conduction path (Boost) | $L, SW_1, SW_2$ | $L, D_1, D_2$ | $L, SW_1, SW_2$ | $L, D_1, D_2$ | $L, SW_1, SW_2$ | $L, D_1, D_2$ |
| Switching components (NSMB) | $SW_2, D_2$ | | $SW_1, SW_2, D_1, D_2$ | | $SW_2, D_2$ | |
| Switching components (Boost) | $SW_1, SW_2, D_1, D_2$ | | $SW_1, SW_2, D_1, D_2$ | | $SW_1, SW_2, D_1, D_2$ | |
| Comparison of switching losses | NSMB losses ≈ 0.33 * Boost losses | | Same | | NSMB losses ≈ 0.33 * Boost losses | |

SYSTEM AND METHOD FOR REGULATION OF MULTI-LEVEL BOOST BASED RECTIFIERS WITH POWER FACTOR CORRECTION

CROSS-REFERENCE TO RELATED APPLICATIONS

This application is a national stage filing under section 371 of International Application No. PCT/EP2014/058117, filed on Apr. 22, 2014, and published in English on Oct. 23, 2014, as WO 2014/170501 A2 and claims priority of U.S. Provisional application 61/813,951 filed on Apr. 19, 2013, the entire disclosure of these applications being hereby incorporated herein by reference.

TECHNICAL FIELD

The present invention relates to regulation of multi-level boost-based power factor correction rectifiers.

BACKGROUND OF THE ART

One of the major drawbacks of boost-based power factor correction (PF) rectifiers is their bulky and heavy inductor significantly affecting the cost of overall system and preventing its use in weight and volume sensitive applications. The large boost inductor also causes non-negligible core losses and results in a relatively large parasitic capacitance of the winding. This capacitance allows high frequency current to flow through the line EMI filter, increasing its size.

Another problem of the conventional boost-based topologies is switching tosses, causing heat dissipation problems whose handling often requires bulky and costly cooling components. The switching losses are mostly related to the operation of the semiconductor switches at relatively high switching voltages. Moreover, one of the main drawbacks of PFC rectifiers for boost converters operating in continuous conduction mode (CCM) is the bulky boot inductor, which is one of the main contributors to the overall weight, volume, and cost of the entire system.

To minimize the size of boost-based PFC inductors and reduce losses, a number of methods have been proposed. However, these methods have limitations.

There is therefore a need for an improved method and system for regulation of multi-level boost-based power factor correction rectifiers.

SUMMARY

In accordance with a first broad aspect, there is provided a system for regulating operation of a non-symmetric boost based front end stage of a rectifier with power factor correction, the system comprising an active capacitive divider coupled to an inductor of the front end stage for reducing a maximum voltage swing value of the inductor.

In accordance with a second broad aspect, there is provided a method for regulating operation of a non-symmetric boost based front end stage of a rectifier with power factor correction, the method comprising reducing a maximum voltage swing value of an inductor of the front end stage using an active capacitive divider.

In accordance with a second broad aspect, there is provided a method for reducing a volume and losses of a boost inductor in a PFC rectifier, the method comprising providing a biasing circuit and an auxiliary winding for providing a low frequency biasing current, thereby cancelling a flux component of the inductor at twice line frequency.

In accordance with a second broad aspect, there is provided a system for reducing a volume and losses of a boost inductor in a PFC rectifier, the system comprising an auxiliary winding coupled to the inductor and a biasing circuit coupled to the auxiliary winding for providing a low frequency biasing current, thereby cancelling a flux component of the inductor at twice line frequency.

BRIEF DESCRIPTION OF THE DRAWINGS

Further features and advantages of the present invention will become apparent from the following detailed description, taken in combination with the appended drawings, in which:

FIG. 3$b$ illustrates the second operating mode of the non-symmetric multi-level boost-based front-end stage of FIG. 2;

FIG. 3$c$ illustrates the third operating mode of the non-symmetric multi-level boost-based front-end stage of FIG. 2;

FIG. 9$b$ is a schematic diagram of a modified forward converter, in accordance with an illustrative embodiment of the present invention;

FIG. 10 is a table comparing switching and conduction losses of a conventional boost converter and the non-symmetric boost-based PFC rectifier of FIG. 2;

FIG. 11$b$ is a plot of current and voltage waveforms for the non-symmetric boost-based PFC rectifier of FIG. 2;

FIG. 11$c$ shows efficiency comparison results for a conventional boost converter and a non-symmetric boost-based PFC rectifier;

It will be noted that throughout the appended drawings, like features are identified by like reference numerals.

DETAILED DESCRIPTION

Figure 1:
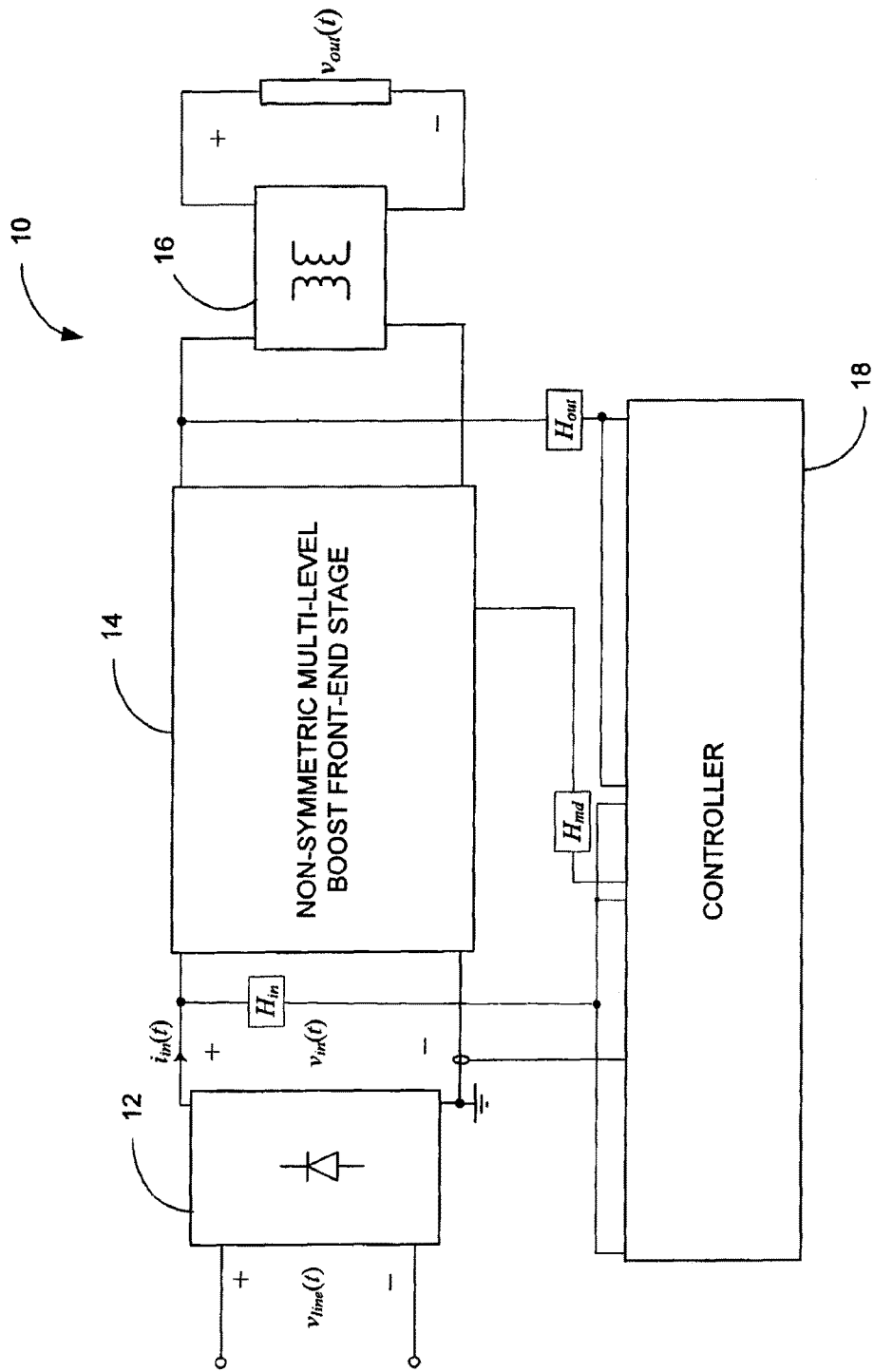
FIG. 1 is a schematic diagram of a non-symmetric boost-based power factor correction (PFC) rectifier, in accordance with an illustrative embodiment of the present invention.

Referring to FIG. 1, a power factor correction (PFC) rectifier 10 according to a first embodiment will now be described. The PFC rectifier 10 is based on the non-symmetric multi-level boost (NSMB) converter topology and illustratively comprises a full-wave diode rectifier 12, a non-symmetric multi-level boost front-end stage 14, a charge-balancing isolated downstream DC-DC stage 16, and a controller 18. The full-wave diode rectifier 12 may be used to rectify an input line voltage $v_{line}(t)$, thereby producing a voltage $v_{in}(t)$. The non-symmetric multi-level boost front-end stage 14 and the controller 18 are then used to force an input current $i_{in}(t)$ to follow the waveform of $v_{in}(t)$ and produce a regulated bus voltage $V_{buss}(t)$. As the bus voltage typically has a high value and cannot be directly used the charge-balancing isolated downstream DC-DC stage 16 is further used to reduce the bus voltage to a lower value. Using the charge-balancing isolated downstream DC-DC stage 16, direct contact with potentially dangerous bus voltage in the case of system failure, thereby improving the safety of the system.

Figure 2:
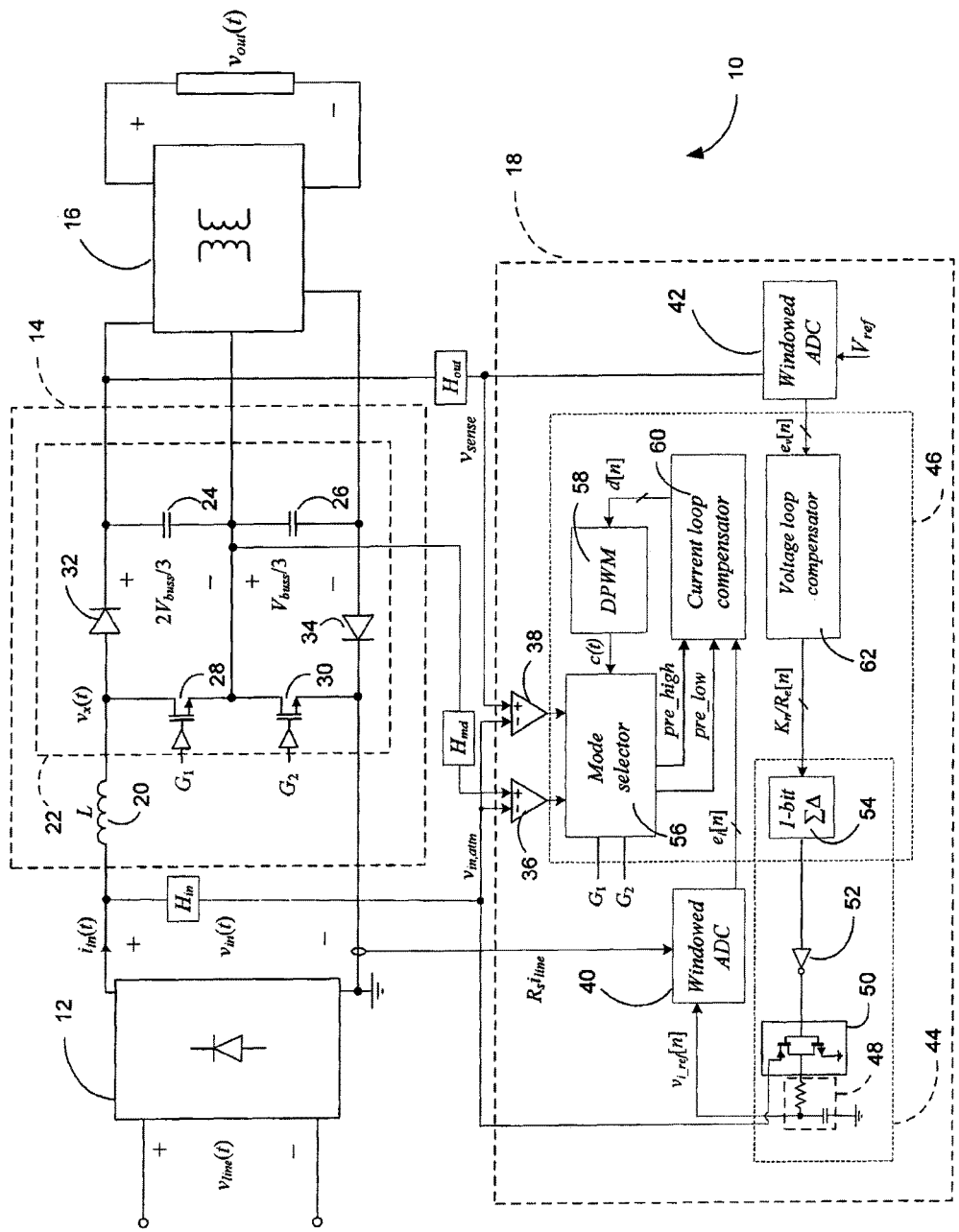
FIG. 2 is a detailed schematic diagram of the non-symmetric boost-based PFC rectifier of FIG. 1.

Referring now to FIG. 2, the non-symmetric multi-level boost front-end stage 14 illustratively comprises an inductor 20 having a value L and a voltage variation with a maximum voltage swing $V_{swing}$. For the maximum inductor current ripple $I_{ripple,max}$, the relationship between the inductor value L and the maximum voltage swing $V_{swing}$ is provided by equation (1) below, which occurs for an input-to-output conversion ratio (or duty ratio) D substantially equal to 0.5:

$$\Delta I_{ripple,max} = \frac{V_{swing}}{4L} \cdot \frac{1}{f_{sw}}, \quad (1)$$

where $f_{sw}$ the switching frequency of the charge-balancing isolated downstream DC-DC stage 16. It can be seen that the maximum ripple, which determines the size of the inductor 20, is linearly proportional to $V_{swing}$. Thus, by minimizing the voltage variation across the boost inductor 20, and more particularly the value of the maximum voltage swing $V_{swing}$, the size of the inductor 20 can be reduced, while maintaining the same current ripple. As such, in order to minimize the inductance volume of the NSMB rectifier 10, the NSMB rectifier 10 is illustratively designed so that the voltage swing of $v_x(t)$ is varied depending on the instantaneous rectified input voltage value $v_{in}(t)$. For this purpose, the swing variation is performed through an active capacitive divider 22 provided in the non-symmetric multi-level boost front-end stage 14. Using the active capacitive divider 22, it can be ensured that the condition for the proper boost operation, i.e. the condition $v_{x\_max} > v_{in}(t)$, where $v_{x\_max}$ is the maximum value of the switching node voltage, is satisfied at all times.

In particular and as will be discussed further below, the active capacitive divider 22 reduces the maximum voltage swing value of the inductor 20 to $V_{buss}/3$, compared to $V_{buss}$ in the conventional case. For proper boost operation, the active capacitive divider 22 also maintains the maximum value of the voltage of the switching node $v_x(t)$ larger than $v_{in}(t)$ at all times. As will be discussed further below, the reduction in swing value may be achieved by setting voltages of divider capacitors 24 and 26, which are provided in the non-symmetric multi-level boost front-end stage 14, to approximately $2V_{buss}/3$ and $V_{buss}/3$, respectively. In one embodiment, the capacitors 24 and 26 are such that the capacitance C2 of capacitor 26 is substantially double the capacitance C1 of capacitor 24, a such that C2=2C1. The reduction in the swing value may further be achieved by modifying the switching sequence of transistors or switches 28 and 30, which are provided in the non-symmetric multi-level boost front-end stage 14, in accordance with the change of $v_{in}(t)$.

Figure 3A:
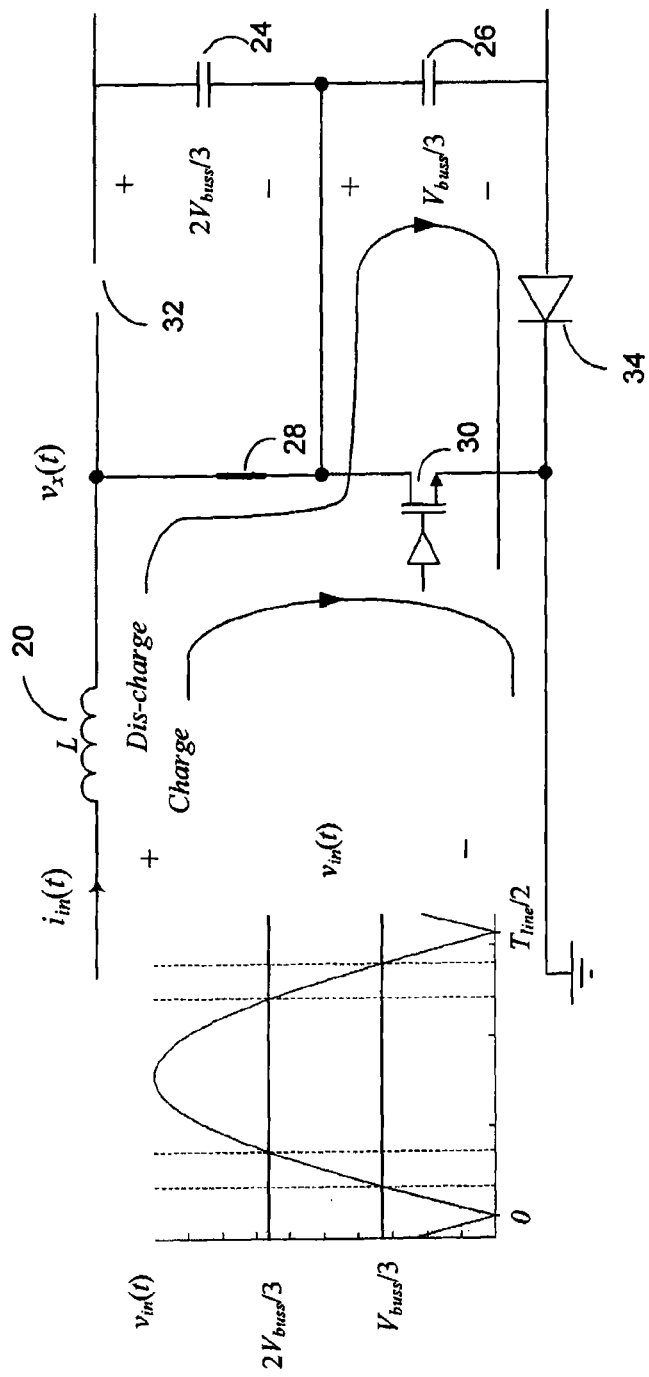
FIG. 3$a$ illustrates the first operating mode of the non-symmetric multi-level boost-based front-end stage of FIG. 2.
Figure 3B:
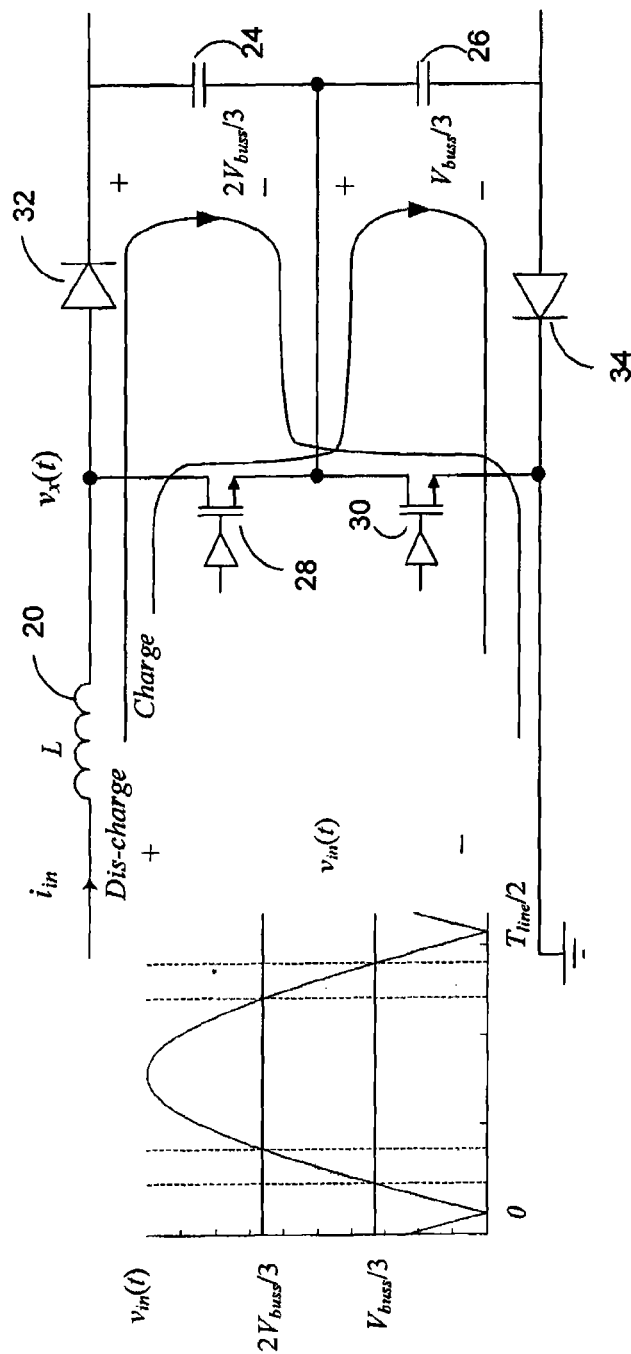
Figure 3C:
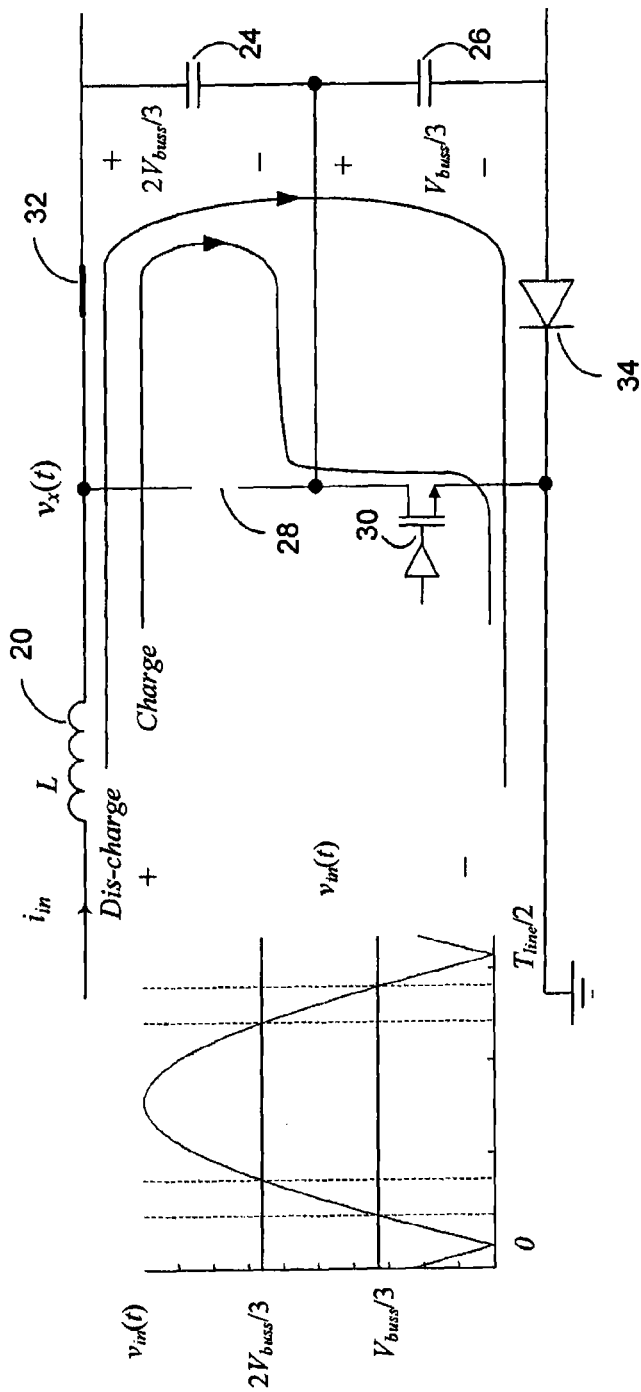

Indeed and referring now to FIG. 3a, FIG. 3b, and FIG. 3c, the voltages of the capacitors 24 and 26 and the switching sequence of the transistors 28 and 30 are set so that the active capacitive divider 22, and accordingly the non-symmetric multi-level boost front-end stage 14, has three (3) distinctive modes of operation depending on the value of the instantaneous input voltage $v_{in}(t)$ received at the active capacitive divider 22.

In particular and referring to FIG. 3a, for $v_{in}(t) < V_{buss}/3$, the active capacitive divider 22 operates in the first mode. In this mode, the transistor 28 is kept on, reverse biasing a diode 32 connecting the transistor 28 and the capacitor 24. The switching sequence is then performed with the transistor 30 and a diode 34 connecting the transistor 30 and the capacitor 26. The conducting paths for both portions of a switching period $T_s = 1/f_{sw}$ corresponding to the charging and discharging processes of the inductor 20 are then shown in FIG. 3a. It can be seen that, in this first mode, the maximum voltage swing across the inductor 20 is $V_{buss}/3$. This mode of operation is maintained as long as the input voltage $v_{in}(t)$ is lower than $V_{buss}/3$ and the condition for proper boost operation, i.e. the condition $v_{x\_max} > v_{in}(t)$ discussed above, is satisfied.

Referring to FIG. 3b, the active capacitive divider 22 operates in the second mode when $V_{buss}/3 < v_{in}(t) < 2V_{buss}/3$. In this mode and during the first portion of a switching period, the transistor 28 and diode 34 are turned on. During the remaining portion of the period, the transistor 30 and diode 32 are conducting. In this manner, the inductor voltage swing is limited and its value does not exceed $V_{buss}/3$. During the first portion of the switching interval, the value of the inductor voltage swing is indeed $v_{in}(t) - V_{buss}/3$ while it becomes $v_{in}(t) - 2V_{buss}/3$ during the remaining time.

Referring to FIG. 3c, the active capacitive divider 22 operates in the second mode when $v_{in}(t)$ exceeds $2V_{buss}/3$. Throughout this mode, the transistor 28 is kept off, allowing diode 32 to conduct. In this case, during the first portion of the switching interval, the transistor 30 is conducting and the voltage across the inductor 20 equals $v_{in}(t)-2V_{buss}/3$. During the second portion of the interval, the diode 34 conducts and the inductor voltage equals $v_{in}(t)-V_{buss}$. Again, it can be seen that the inductor voltage swing is no larger than $V_{buss}/3$.

By operating transistor 28 and diode 32 with two-thirds (⅔) of the full output voltage $V_{buss}$ and interrupting transistor 30 and diode 34 at values not larger than $V_{buss}/3$, lower voltage stress can be achieved on the NSMB rectifier 10. As a result, the NSMB rectifier 10 can achieve low switching losses, thereby decreasing the overall losses of the NSMB rectifier 10. This is achieved in addition to voltage swing minimization, which results from reducing the size of the inductor 20 to one third (⅓) of its conventional value.

Referring back to FIG. 2, the switching sequence for the active capacitive divider 22 that has been discussed above with reference to FIG. 3a, FIG. 3b, and FIG. 3c is illustratively generated by the controller 18. For this purpose, the controller 18 comprises first and second comparators 36, 38, first and second windowed based Analog-to-Digital Converters (ADC) 40, 42, a merged multiplier and Digital-to-Analog converter (DAC) 44, and digital logic 46. The merged multiplier and Digital-to-Analog converter (DAC) 44 illustratively comprises an RC filter 48, a level shifter 50, an inverter 52, and a 1-bit sigma-delta modulator 54. The digital logic 46 illustratively comprises a mode selector 56, a digital pulse-width modulator (DPWM) 58, a current loop compensator 60, and a voltage loop compensator 62. The 1-bit sigma-delta modulator 54 may be provided as part of the digital logic 46 or the merged multiplier and DAC 44. Also, although the controller 18 is implemented using the average current programmed mode architecture, it should be understood that other control architectures may apply, including the peak current programmed mode architecture and the like.

The windowed based ADC 42 outputs to the voltage loop compensator 62 the digital equivalent $e_v[n]$ of the value of the output voltage error. The voltage loop compensator 62 then outputs a reference $K_n/R_e[n]$, which is inversely proportional to a desired emulated resistance $R_e$ seen at the input of the NSMB rectifier 10. The reference value is then sent to the 1-bit sigma-delta modulator 54, whose output is passed to the inverter 52, then the level shifter 50, and the RC filter 48. The RC filter 48 then produces an analog reference $v_{i\_ref}[n]$ for the current loop compensator 60. The analog reference $v_{i\_ref}[n]$ is sent to the windowed ADC 40 where it is compared to a sensed input current value $R_s i_{line}(t)$. A digital equivalent $e_i[n]$ of the current error signal is then created by the windowed ADC 40 and this error value $e_i[n]$ is further sent to the current loop compensator 60. The current loop compensator 60 further takes produces a duty ratio value d[n], which serves as the control signal for the DPWM 58, as will be discussed further below. On the basis of the received control signal d[n], the DPWM 58 outputs a control value c(t), which is then passed to the mode selector 58. The mode selector 56 also receives data from the comparators 36, 38, which monitor the difference between the taps of the active capacitive divider 22 and the input voltage $v_{in}(t)$. According to the state of the comparators 36, 38, the mode selector 56 then creates a switching sequence. In particular, the mode selector 56 generates switching signals G1 and G2 for use by the switches 28 and 30, respectively.

Figure 4:
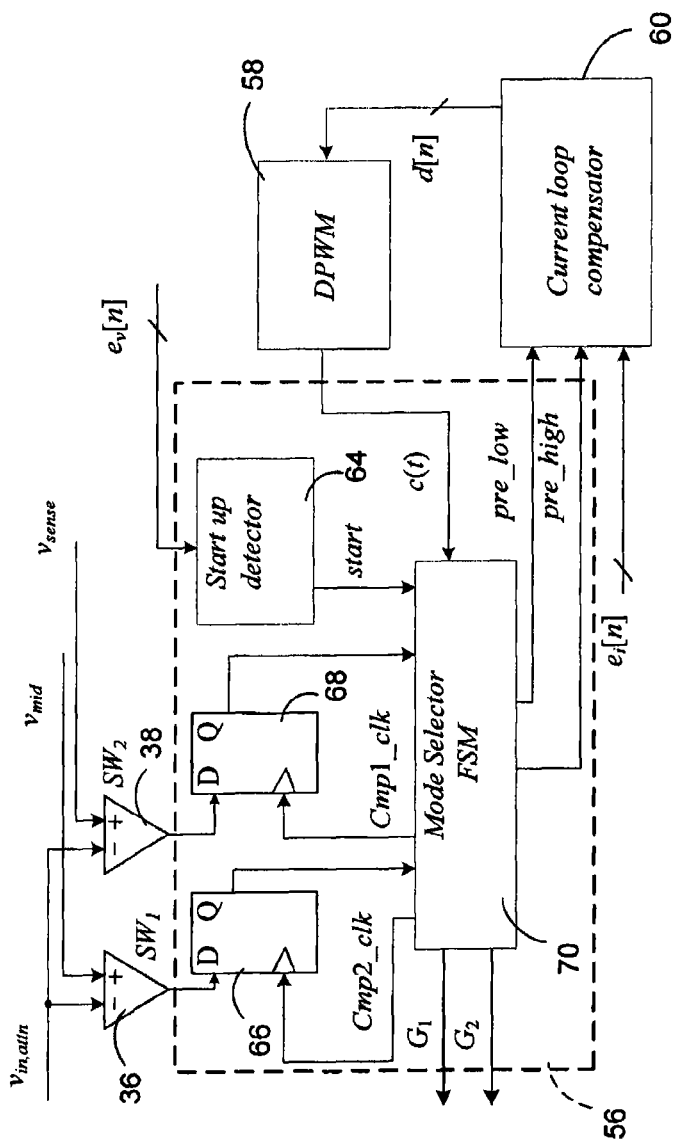
FIG. 4 is a circuit illustrating an implementation of the mode selector of FIG. 2.

Referring now to FIG. 4 in addition to FIG. 2, the mode selector 56 illustratively comprises a start up detector module 64, flip-flops 66, 68, and a finite state machine (FSM) 70. The mode selector 56 illustratively implements a control method for seamless transition between the modes of the active capacitive divider 22 as well as provides for a stable start up of the system, thereby enabling practical use of the non-symmetric multi-level boost front-end stage 14. In particular, the mode selector 56 illustratively selects the proper mode of operation for the active capacitive divider 22 on the basis of inputs from the start up detector module 64 and the comparators 36, 38. From the received input, the mode selector 56 then generates the switching signals G1 and G2 to be sent to the capacitive divider switches 28, 30.

Moreover; the mode selector 56 implements sampling logic that ensures that correct information is passed to the controller 18 and both the voltage and current loop compensators 62, 60 can operate without stability issues. Indeed, stability problems can arise due to the fact that the maximum and minimum values $v_{x,min}$, $v_{x,max}$ of the switching node voltage $v_x(t)$ change drastically with each transition from one mode of the active capacitive divider 22 to the next, as seen in FIG. 3a, FIG. 3b, and FIG. 3c. Considering the fact that during the switching cycles right before and after a mode transition, the input voltage $v_{in}(t)$ remains practically unchanged, it can be understood that the voltage waveforms across the inductor 20 before and after the mode transition become drastically different. As a result, right after the transition, the current slew rate of the inductor 20 also drastically changes resulting in high current peaks, erroneous input current measurement and in turn, system instability. From the conversion ratio point of view, this translates into the fact that each mode change reconfigures the structure of the converter and requires a drastic change of the input-to-output conversion ratio, i.e. the duty ratio variable issued by the controller 18.

Figure 5:
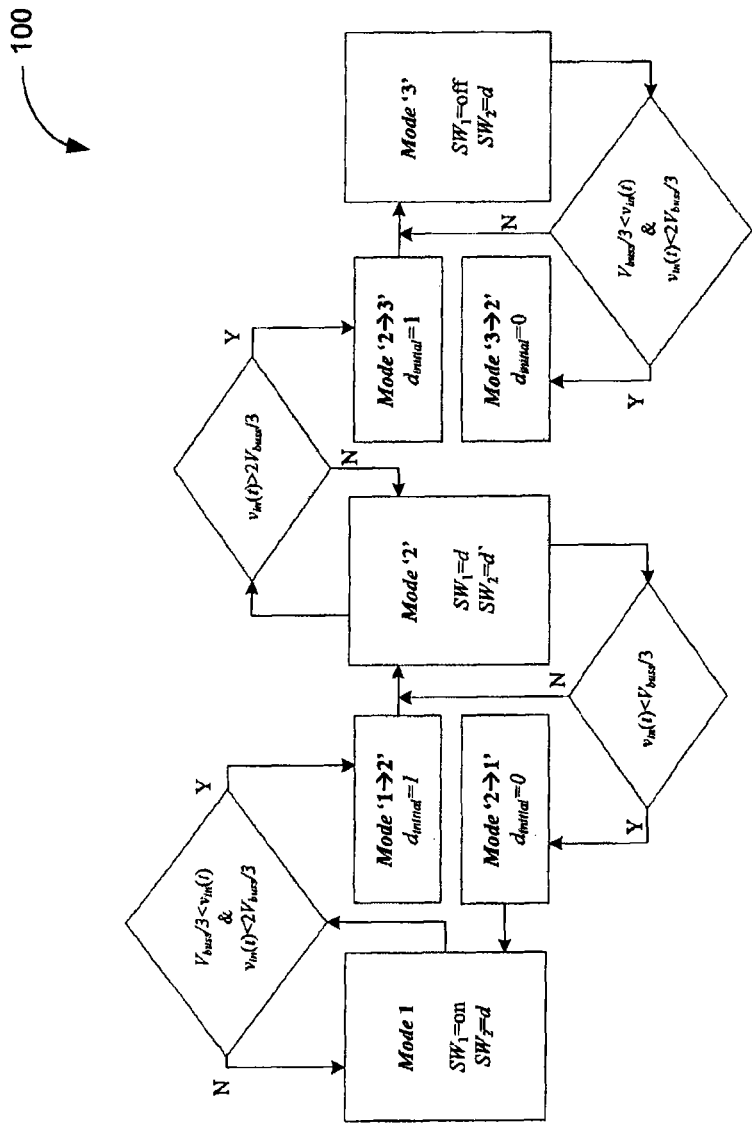
FIG. 5 is a flowchart of a seamless mode transition algorithm, in accordance with an illustrative embodiment of the present invention.

In one embodiment, after each mode transition, the current loop compensator 60 changes the duty ratio such that stability is maintained in all operating conditions. The decision about the new duty ratio value is made based on the recognition that after each mode transition, the new duty ratio will either be equal to one (1) or infinite. Accordingly, depending on the type of transition, the duty ratio is set to either zero (0) or one (1). For this purpose, the FSM 70 sends a pre_low or pre_high preset signal to the current loop compensator 60 in accordance with the algorithm 100 illustrated in FIG. 5. Depending on the reception of the preset signal, the previous value of the duty register of the compensator, i.e. d[n−1] in digital implementation of the current loop compensator 60, is set to either 0 or its maximum value as per equation (2) below:

$$d[n]=d[n-1]+a.e_i[n]-b.e_i[n-1] \qquad (2)$$

where d[n] is the newly calculated value of the duty ratio, $e_i[n]$ and $e_i[n-1]$ are the current and previous values of current error respectively, and a and b are coefficients of the current loop compensator 60.

During steady state, centre tap voltage regulation of the active capacitor divider 22 is performed by the charge-balancing isolated downstream DC-DC stage 16. However, during start up and under zero load operation, the charge-balancing isolated downstream DC-DC stage 16 is not capable of maintaining the charge balance across the capacitors 24, 26. As a result, the balancing by the charge-balancing isolated downstream DC-DC stage 16, which relies on the output capacitor discharge, cannot be performed. In one embodiment, in order to operate the converter during start up and under no-load conditions, the converter is operated as a conventional boost, such that both transistors 28, 30 are turned "on" state, i.e. the first portion of a switching interval, which is followed by the conduction period of the diodes (references 32, 34 in FIGS. 3a, 3b, and 3c). Operating the converter in this mode results in the equal amount of charge owing delivered to both capacitors 24, 246 of the active capacitive divider 22. However, since the capacitor 26 illustratively has twice the capacitance of capacitor 24, the voltage Vbuss is illustratively distributed as shown in FIG. 2.

Figure 6:
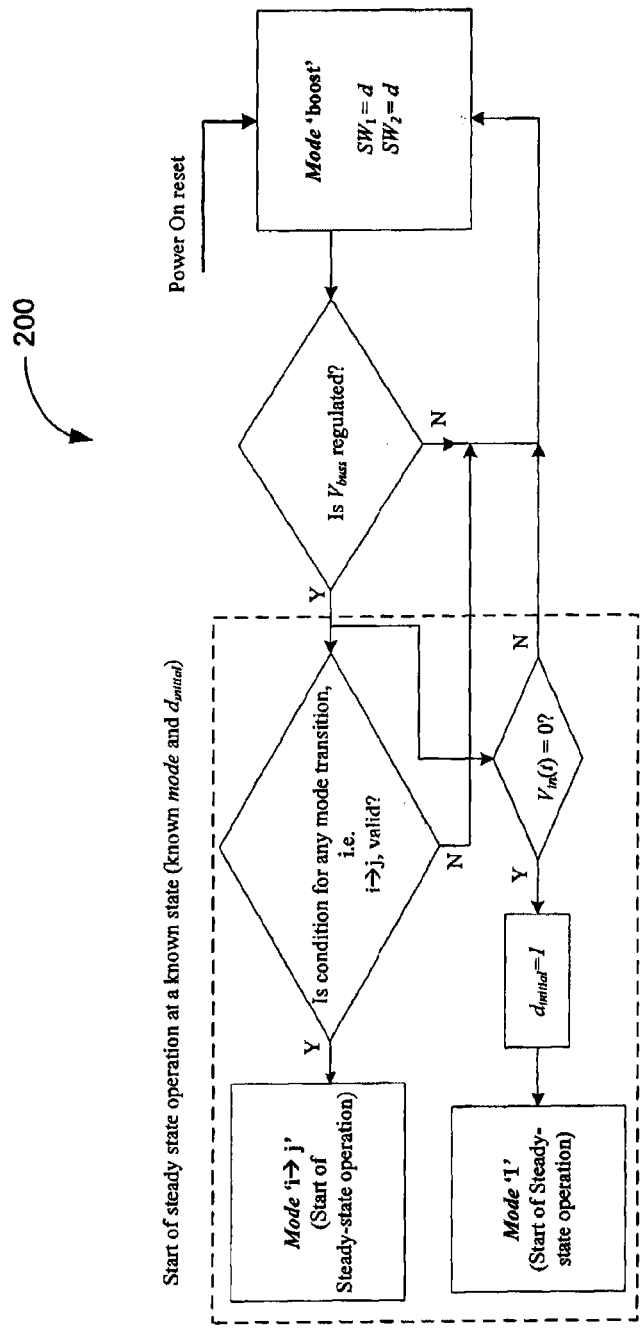
FIG. 6 is a flowchart of a start-up and no load algorithm, in accordance with an illustrative embodiment of the present invention.
Figure 7:
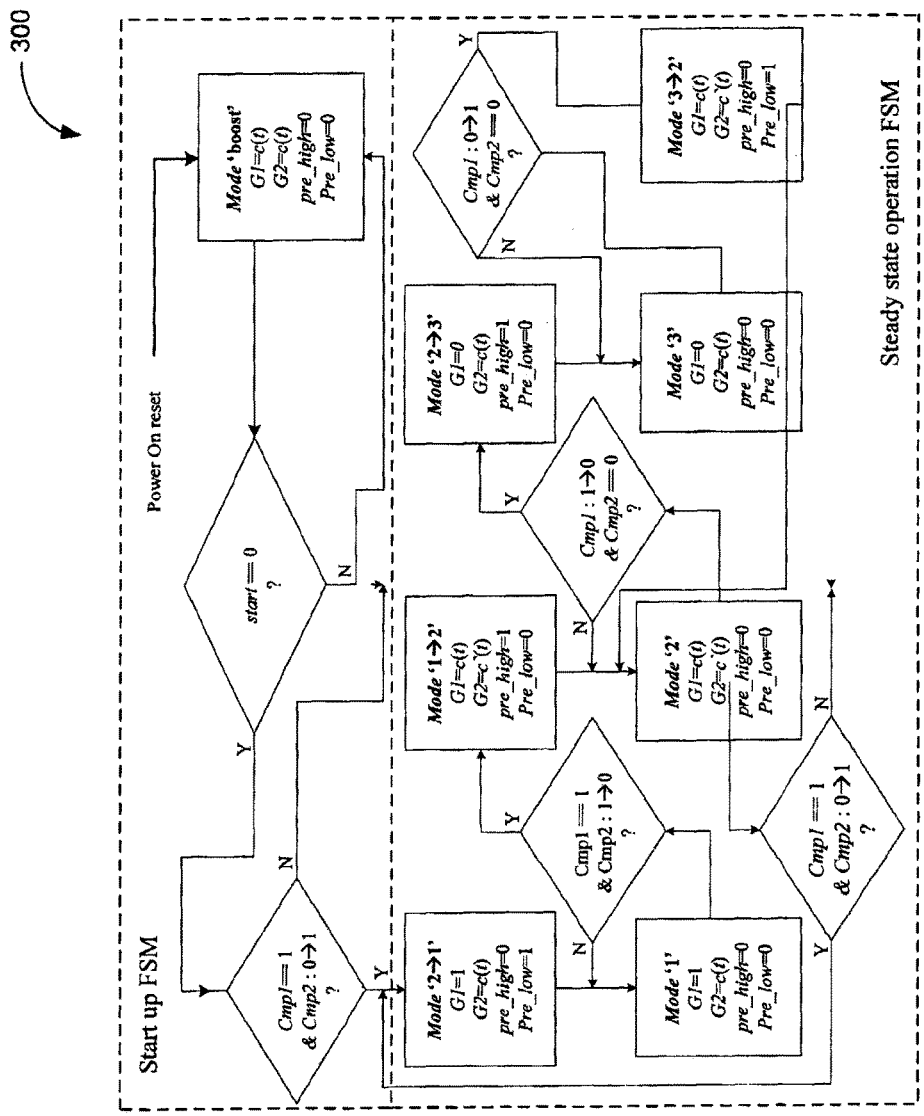
FIG. 7 is a flowchart of implementation of a finite state machine of the algorithms of FIGS. 5 and 6.

During the start up period, as detected by the start up detector module (reference 64 in FIG. 4), the mode selector 56 operates the converter in boost mode by sending same switching signals to transistors 28 (SW1) and 30 (SW2). The corresponding algorithm 200 is illustrated in FIG. 6. The algorithms of FIG. 5 and FIG. 6 may be implemented with a single finite state machine 300 whose description is given in FIG. 7.

Figure 8:
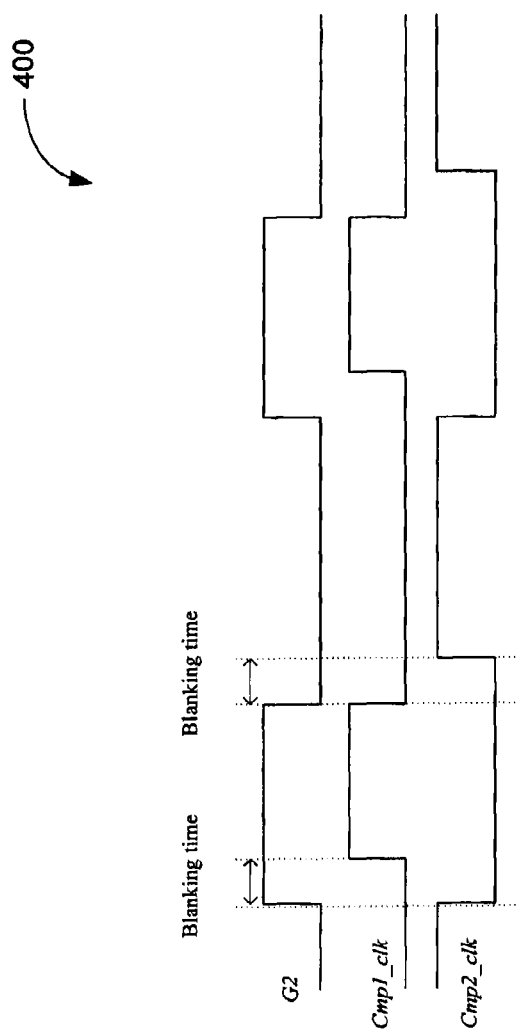
FIG. 8 is a schematic diagram of a timing sequence for sampling of the divider capacitors of FIG. 2.

Referring now to FIG. 8 in addition to FIG. 2, the comparison of the input voltage $v_{in}(t)$ with the voltage across capacitors 24, 26 of the active capacitive divider 22 is illustratively done at particular time instants or sampling points. The sampling points are selected so that the influence of mode changes is eliminated and the need for a costly differential stage for acquisition of the output voltage of the capacitors 24, 26 is eliminated. In order to acquire the information about the capacitor 24, the value of the latter is sampled during the "on" state of the transistor 30. This allows the acquisition of the voltage of capacitor 24 without the use of a costly differential stage and, potentially, measurement of the voltage value of capacitor 24 with the ADC 42. Similarly, in order to acquire data about the voltage of capacitor 26, data acquisition is performed during the "off" state of transistor 30, i.e. during the "on" state of diode 34. This again eliminates the need for the use of a differential stage and allows simple hardware implementation.

In the system of FIG. 2, this sampling algorithm is applied such that the output of comparator 38 is only observed during the "on" period of transistor 30 and the output of comparator 36 during the "off" period of transistor 30. In order to FSM (reference 70 in FIG. 4) of the mode selector (reference 56 in FIG. 4) with proper inputs, the comparator outputs are sampled by clock signals Cmp1_clk and Cmp2_clk generated by the FSM 70. Also, in order to eliminate the effect of switching on the comparator outputs, blanking times of the comparators are introduced, as shown in the timing sequence 400 illustrated in FIG. 8.

Figure 9A:
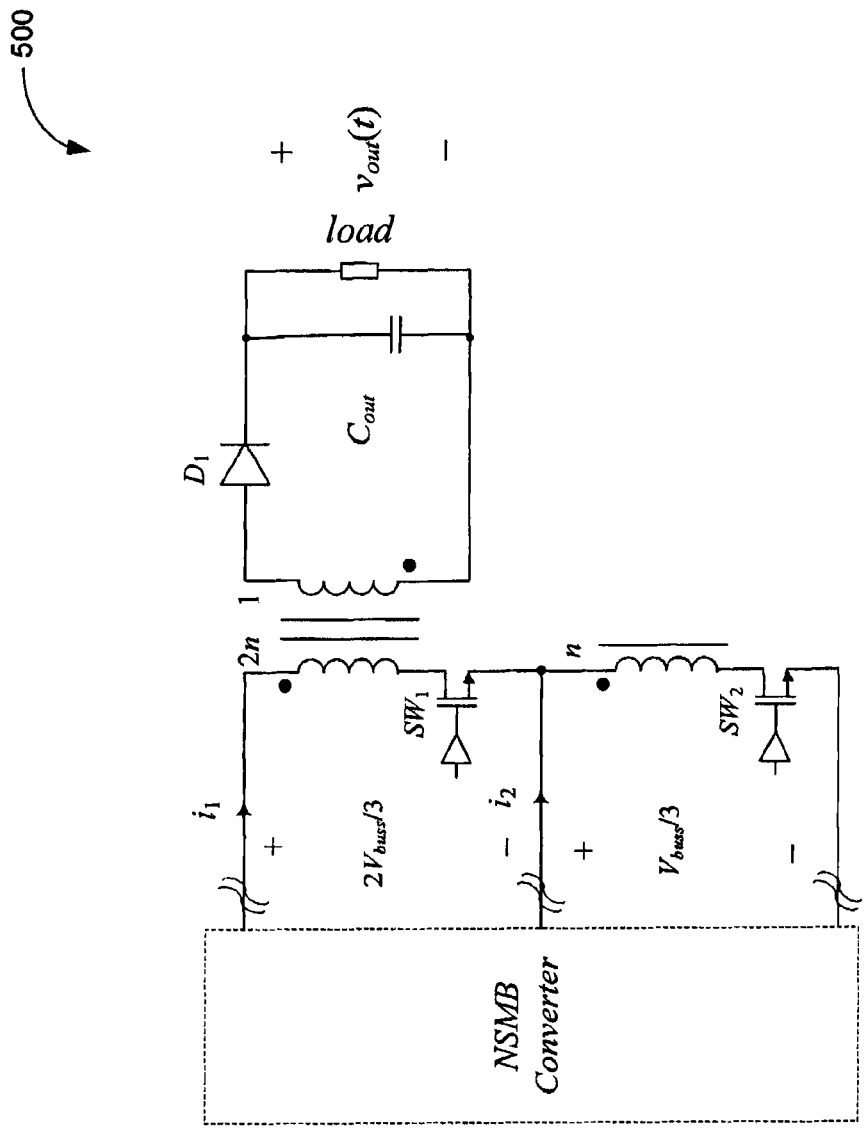
FIG. 9$a$ is a schematic diagram of a modified flyback converter, in accordance with an illustrative embodiment of the present invention.
Figure 9B:
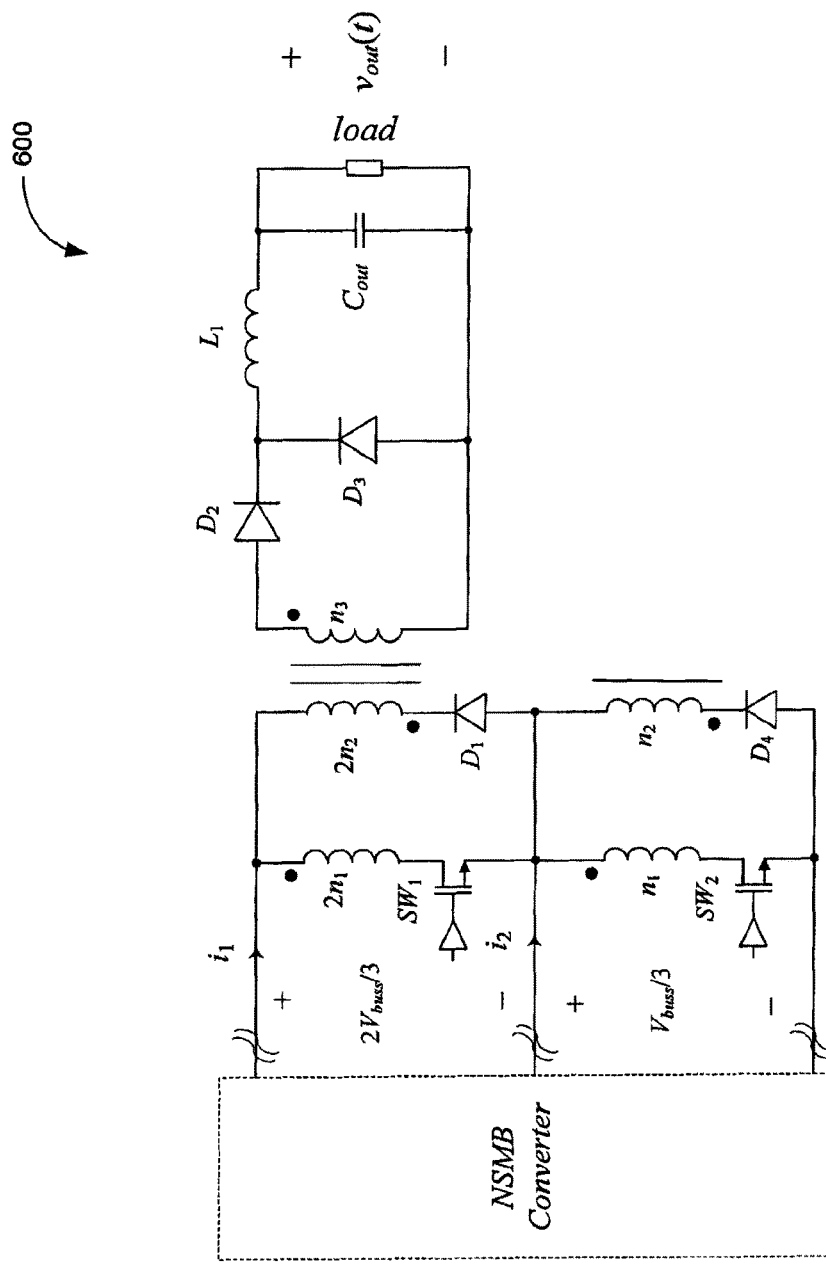

Referring now to FIG. 9a and FIG. 9b in addition to FIG. 2, the active capacitive divider 22 at the output of the non-symmetric multi-level boost front-end stage 14, allows for the use of dual-input, i.e. multi-level, downstream converter stages, such as the charge-balancing isolated downstream DC-DC stage 16. Such dual-input downstream converters prove efficient in terms of power processing and result in reduced volume of the overall rectifier as in 10. Also, such converters can be used for centre-tap voltage regulation that, in this case, cannot be achieved applying techniques for the conventional multi-level solutions that have equal voltages across divider capacitors. In this case, the downstream converter can be used for balancing. The output currents of the divider tap can be regulated with input currents of the downstream stage in a merged switch-capacitor and buck converter stage. FIG. 9a and FIG. 9b illustrate two (2) of several possible implementations of the isolated multi-level downstream converter as in 16. FIG. 9a shows a modified flyback converter 500 while FIG. 9b shows a forward converter 600. In both converters 500 and 600, the volume and efficiency savings are obtained on the principle of inductor voltage swing reduction;

Still referring to FIG. 2, the minimum silicon area required for the implementation of the NSMB rectifier 10 can be found by looking at the voltage and current stress of the switching components, namely the transistors 28, 30 and the diodes 32, 34. The switching components of the NSMB rectifier 10 have lower voltage ratings than in conventional boost PFC rectifiers. Indeed, transistor 28 and diode 32 are rated at $2V_{buss}/3$ while transistor 30 and diode 34 are rated at $V_{buss}/3$. As a result, the silicon area required for the switching components of the NSMB rectifier 10 is equal to the total area needed for the conventional boost PEG rectifiers. Assuming the output capacitor of the conventional boost PFC is $C_{out}$, rated at $V_{out}$, the NSMB converter rated for the same output power needs a $C_{out1}=3C_{out}/2$, rated at $2V_{out}/3$ and a $C_{out2}=3C_{out}$, rated at $V_{out}/3$. Since the volume of a capacitor depends on its energy storage capacity [19] i.e. $W_e=\frac{1}{2}CV^2$, the total volume of the divider capacitors is no larger than that of the conventional boost converter. As a result, compared to a boost PFC, the NSMB rectifier 10 reduces the inductance volume by three (3) times without affecting the size of other power stage components.

Referring now to FIG. 10, table 700 compares the switching and conduction losses of a conventional boost-based PFC converter (not shown) with the NSMB converter during different operating modes. From the table 700, it can be concluded that, compared to a conventional boost-based PFC converter, the switching losses of the NSMB converter over one line cycle are reduced mainly due to switching lower voltages across smaller switches. Moreover, by analyzing conduction losses over one cycle, it can be found that the portion of losses contributed by the switching components, i.e. switch "on" state resistances and forward voltage drop of diodes, are equal for both converters. However, the equivalent series resistance of the inductor (DCR) in the NSMB converter is effectively reduced by three times as a result of utilizing smaller inductor, decreasing overall conduction losses. In table 700, it has been assumed that the switch and diode of the conventional asynchronous boost converter are composed by a series combination of transistors 28, 30 (see FIG. 2) and of diodes 32, 34 (see FIG. 2) respectively.

Figure 11A:
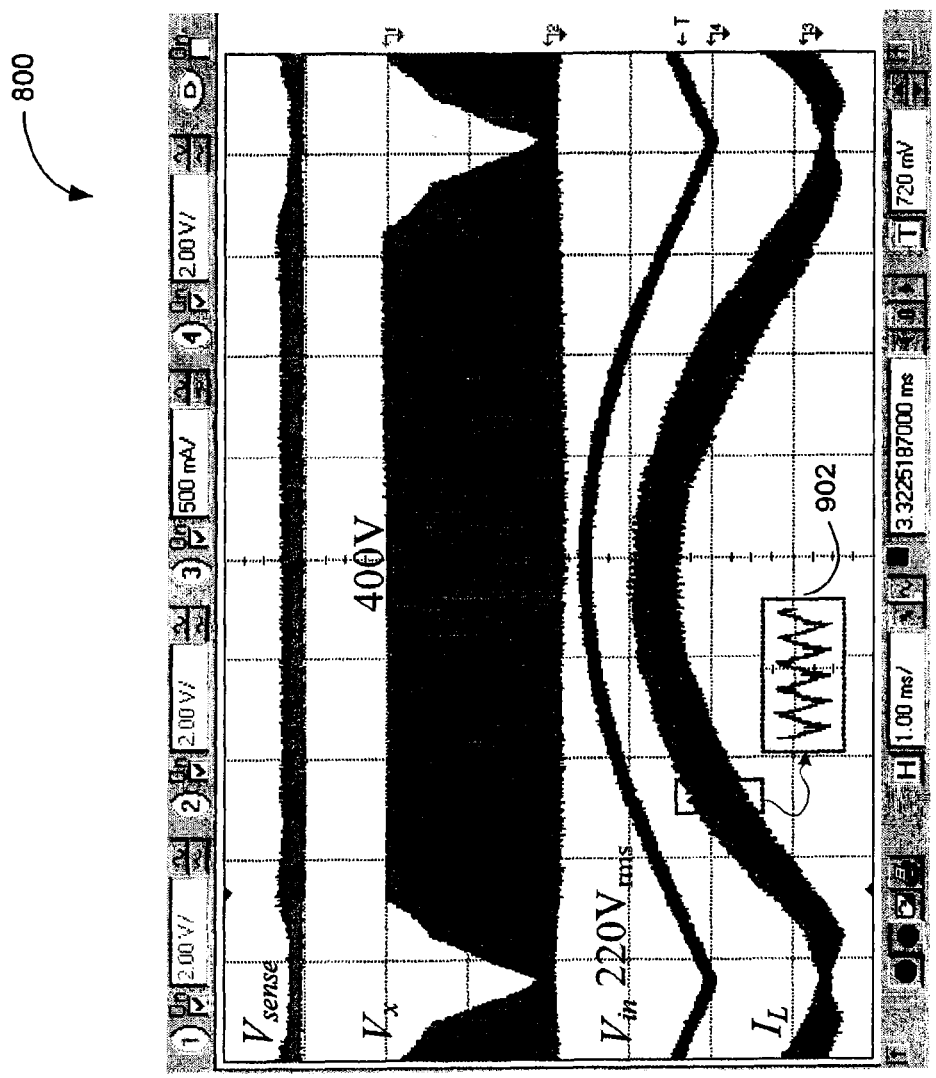
FIG. 11$a$ is a plot of current and voltage waveforms for a conventional boost converter.
Figure 11B:
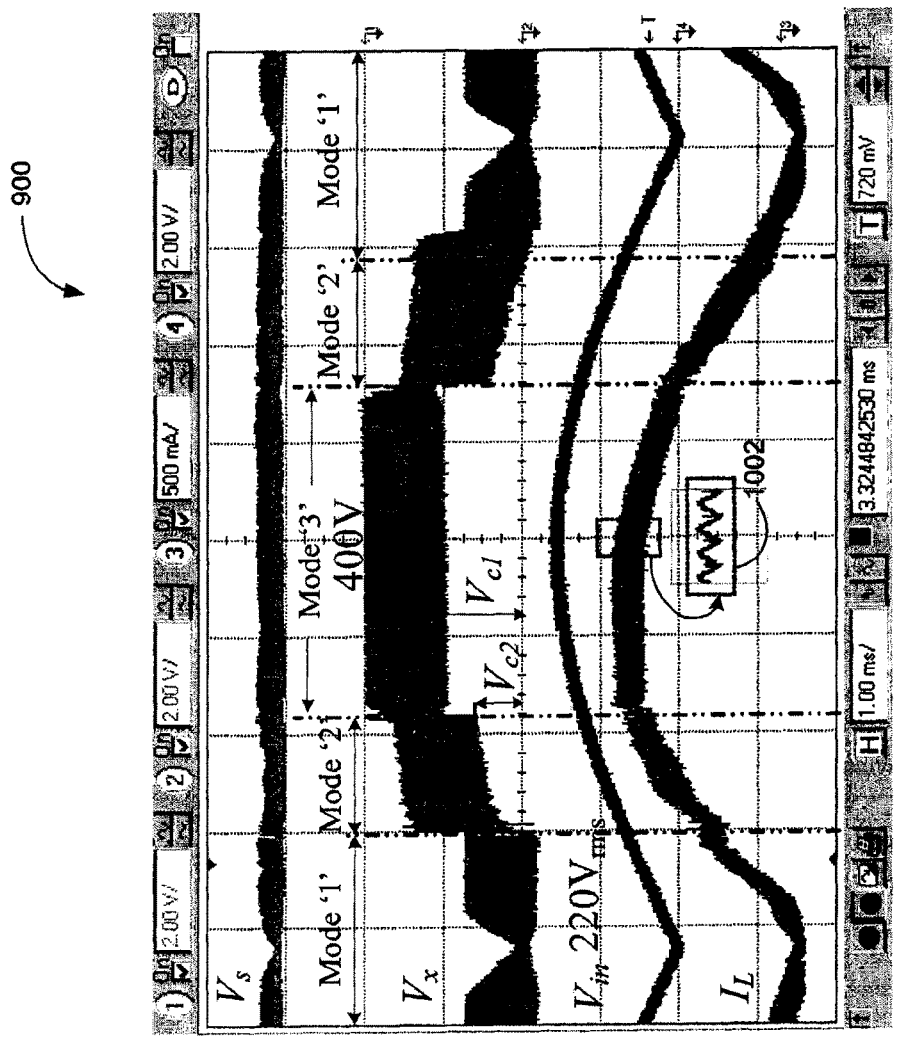
Figure 11C:
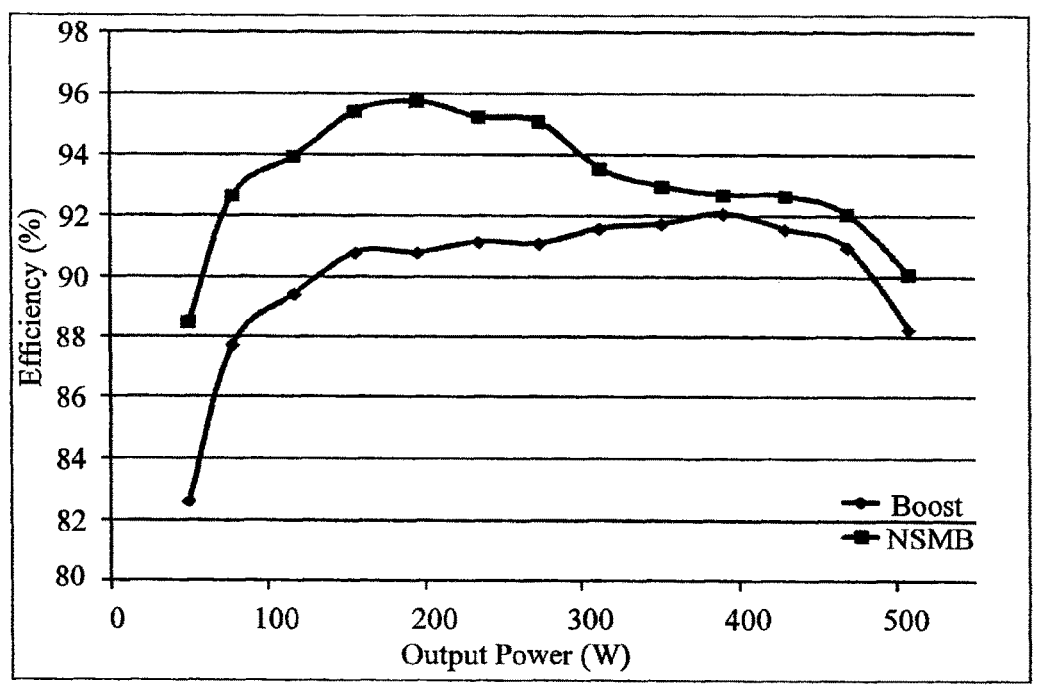

FIG. 11a, FIG. 11b, and FIG. 11c illustrate test results validating the performance and functionality of the NSMB-based PFC topology discussed herein above with reference to FIG. 2. For this purpose, a universal-input 500 W, 200 kHz experimental prototype was built on the basis of the diagrams of FIG. 2, FIG. 4, FIG. 7, FIG. 8. The performances of the prototype were then evaluated and compared to a conventional boost-based PFC solution (not shown) having the same switching frequency and output power rating. Power factor for both cases is measured to be over 0.98.

The plot 800 of FIG. 11a shows the key current and voltage waveforms for steady-state operation of the conventional boost-based PFC converter we the plot 900 of FIG. 11b shows the waveforms for steady-state operation of the NSMB-based PFC rectifier (as in 10 of FIG. 2). For illustrative purposes, the inductors (as in reference 20 in FIG. 2) of both stages are selected to be the same (e.g. 680 μH). In both FIG. 11a and FIG. 11b, $V_{sense}$ is the output voltage measurement signal, i.e. the voltage across the inductor 20 (waveform at 2 V/div), $V_x$ is the inductor switching node voltage (waveform at 200 V/div), $V_{in}$ is the input line voltage (waveform at 200 V/div), and $I_L$ is the inductor or input line current (waveform 500 mA/div). The zoomed in versions 902 and 12 of the inductor current $I_L$ are also shown (waveforms at 10 μs/div) for the portion of the inductor current $I_L$ with maximum current ripple.

It can be seen from plots 800 and 900 that, as discussed above, the NSMB rectifier as in 10 has about three (3) times smaller inductor voltage swing $V_{swing}$ than the conventional boost-based PFC converter. Also, the maximum current ripple of the NSMB rectifier as in 10, as seen from the plot of the inductor current $I_L$, is also about three (3) times smaller than the maximum current ripple of the conventional boost-based PFC converter. In other words, for the same maximum current ripple, the NSMB rectifier 10 allows for the use of an inductor as in 20 that is three (3) times smaller than the inductor used for the conventional boost-based PFC converter. The NSMB-based PFC rectifier 10 thus operates without stability issues in addition to providing regulation of the output voltage.

FIG. 11c shows efficiency comparison results for both stages operating with 220Vrms input line voltage $V_{in}$. Also, the NSMS rectifier 10 has three (3) times smaller inductor than boost, to achieve the same inductor current ripple. It can be seen that, because of the reduction of both switching and conduction losses, due to lower switching voltages and inductor dc winding resistance (DCR), the introduced NSMB-PFC has up to 6% improved efficiency over the conventional solutions.

Figure 12:
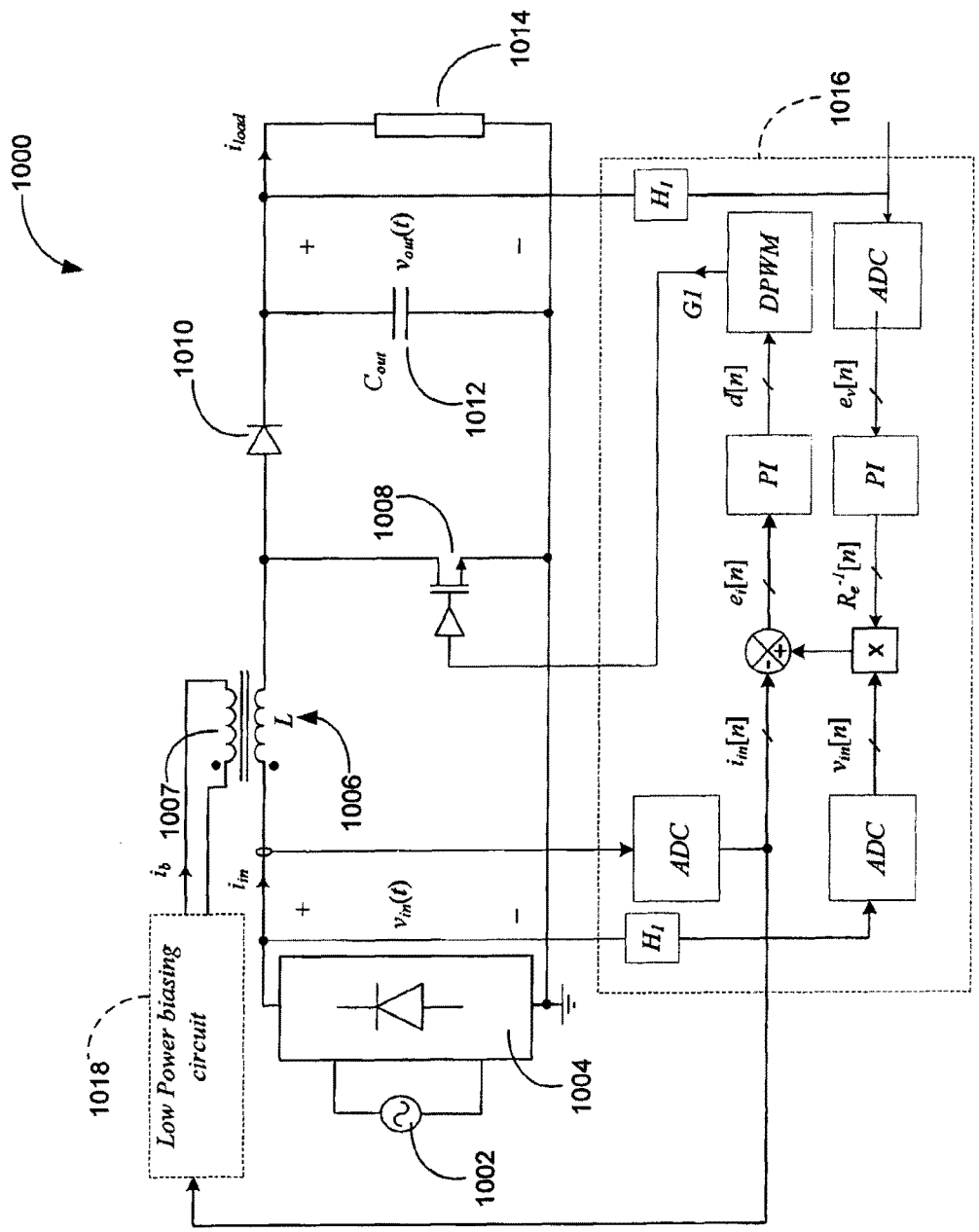
FIG. 12 is a circuit illustrating a PFC boost-based rectifier with biasing system, in accordance with an illustrative embodiment of the present invention.

Referring now to FIG. 12, a PFC boost-based rectifier 1000 according to another embodiment will now be described. The rectifier 1000 illustratively comprises an alternative current (AC) line input 1002, a full-wave diode rectifier 1004, an inductor 1006 having an added winding 1007, a transistor 1008, a diode 1010, a capacitor 1012, an output load 1014, a digital controller 1016, and a low power biasing circuit 1018. The biasing circuit 1018 and the additional inductor winding 1007 are illustratively used to reduce the flux density in the inductor core, thereby allowing reduction of the volume and weight of the inductor 1006. The biasing circuit 1018 uses a low frequency biasing current $i_b(t)$ that is a scaled version of the rectified input line voltage $v_{in}(t)$. The scaling illustratively depends on the amplitude of the input voltage $v_{in}(t)$ and on the power provided at the output of the PFC rectifier 1000, i.e. on the value of the output load 1014.

Provision of the biasing circuit 1018 along with the additional winding 1007 enable to cancel a flux component through the magnetic core (not shown) of the inductor 1006 occurring at twice line frequency, such flux component being caused by the rectified input current $i_{in}(t)$. Indeed, the additional winding 1007 creates a flux of same amplitude and opposite direction to that of the original component at the twice line frequency, i.e. the low frequency component of the flux through the inductor magnetic core. It should be noted that, in addition to the low frequency component, the flux through the inductor magnetic core may also comprise a component at the switching frequency of the converter. The switching frequency flux component is under normal operating conditions, smaller than the low frequency component but may also be cancelled using the biasing circuit 1018 and additional winding 1007.

Figure 13:
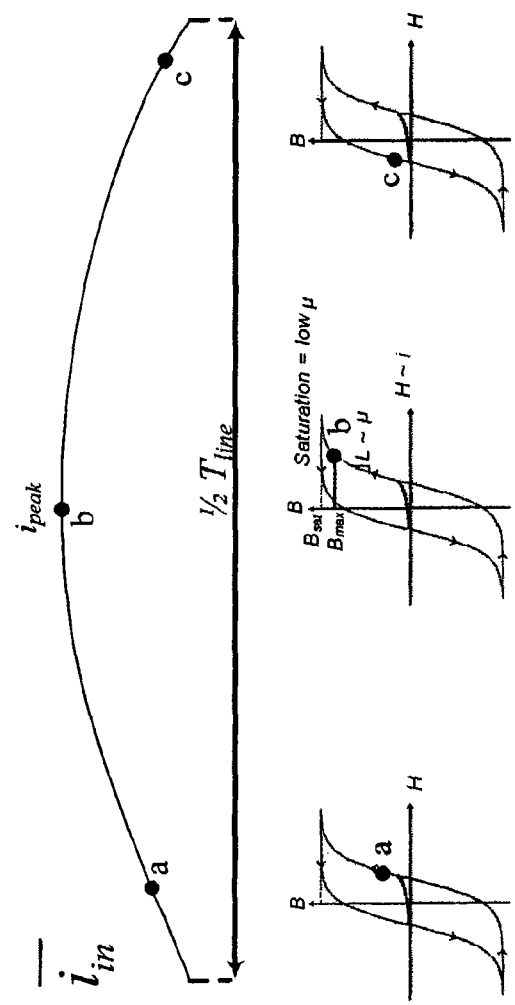
FIG. 13 is a schematic diagram of the inductor current and B-H curve of a conventional boost PFC during one half line cycle.

Since the inductor volume and core losses are mainly caused by the flux component, use of the biasing circuit 1018 and additional winding 1018 further allows for a proportional reduction in the volume of the inductor 1006 and, consequently, in a reduction in the core losses. The relationship between the volume of the inductor 1006, flux density, and peak inductor current can be understood as follows with reference to FIG. 13 and FIG. 14. In order to obtain a high power factor in a conventional boost PFC system (not shown) operating in continuous conduction mode (CCM), the inner feedback or current loop of the rectifier forces the low frequency component of the inductor current to follow a rectified sinusoidal input voltage waveform $v_{in}(t)$. As a result, the flux inside the magnetic core changes accordingly. FIG. 13 illustrates the inductor current $I_{in}$ and B-H curve of a conventional boost PFC system during one half line cycle. As shown in FIG. 13, magnetic cores are usually sized such that, for the peak input current $i_{peak}$, the flux density $B_{peak}$ does not exceed a maximum allowable value $B_{max}$. This means that the cross-section area of the inductor core and, therefore, the overall volume of the inductor, are selected to have a size sufficiently large to avoid core saturation for all operating conditions.

Figure 14:
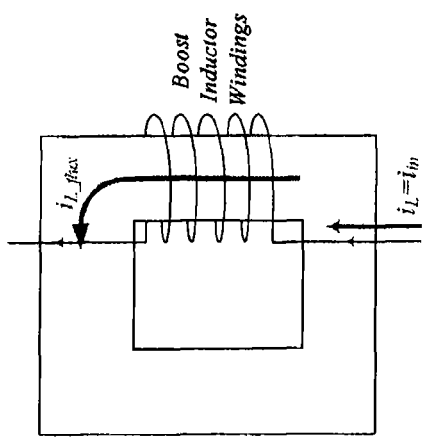
FIG. 14 is a schematic diagram of an exemplary geometry for the inductor of a conventional boost PFC.

The magnetic field and hence the magnetic flux for a typical core without air gap (as shown in FIG. 14) are proportional to the inductor current. Therefore, the flux density B can be related to the inductor current through the following equation:

$$ni_{in}(t) = \frac{B(t)l}{\mu} = \frac{\varphi(t)l}{A_c\mu}, \qquad (3)$$

where n is the number of turns, $i_{in}(t)$ is the boost inductor current, B(t) is the magnetic flux density, μ the permeability of the magnetic material, φ(t) is the flux, $A_c$ is the core cross sectional area and I is the length of the magnetic flux path, i.e. length of core.

In order to avoid core saturation, the maximum flux density $B_{max}$ should not exceed a saturation point $B_{sat}$, which is typically a property of the core inductor material. By looking at equation (3) it can be seen that, in order to satisfy the relationship $B_{max} < B_{sat}$ at all times, the minimum length of the core $l_{min}$ needs to be:

$$l_{min} = \frac{\mu n}{B_{sat}} i_{peak} \qquad (4)$$

Equation (4) indicates that the minimum length $l_{min}$ of the core is proportional to the peak value $i_{peak}$ of the inductor current.

On the other hand, the inductance value L, which is determined in accordance to the maximum allowable inductor current ripple and the switching frequency of the converter, can be given by the following expression:

$$L = \frac{\mu n^2 A_c}{l} = \frac{\mu n^2 V_c}{l^2}, \qquad (5)$$

where $V_c$ is the inductor core volume.

By combining equations (4) and (5), one can find the following expression for the inductor volume:

$$V_c = \frac{L l_{min}^2}{\mu n^2} = \frac{L \mu}{B_{sat}^2} i_{peak}^2 \qquad (6)$$

Equation (6) shows that, for a given $B_{sat}$ and inductance value, the volume $V_c$ of the inductor core is inversely proportional to the squared value of the peak inductor current $i_{peak}$ causing the flux through the core. It should also be noted that the core volume $V_c$ is directly proportional to its losses.

FIG. 13 also shows how the operating point on the B-H curve changes with the input current $i_{in}$, the corresponding points being labelled with letters a to d. The changes in points a to d reveal that, as the inductor current $i_{in}$ changes from its minimum value to the maximum value, only the two positive quadrants of the B-H curve are utilized. This means that in a conventional boost based PFC, the inductor is largely underutilized.

Referring back to FIG. 12, the implementation of the low frequency flux component cancellation technique discussed above is illustrated for a single phase PFC rectifier as in 1000. This implementation uses readily available information about the phase and amplitude of the rectified line current, existing in the inner feedback loop, i.e. current loop of the rectifier as a reference current. The reference current is used to setup the desired value of the biasing current, which creates a low-frequency canceling flux for the magnetic core.

Figure 15:
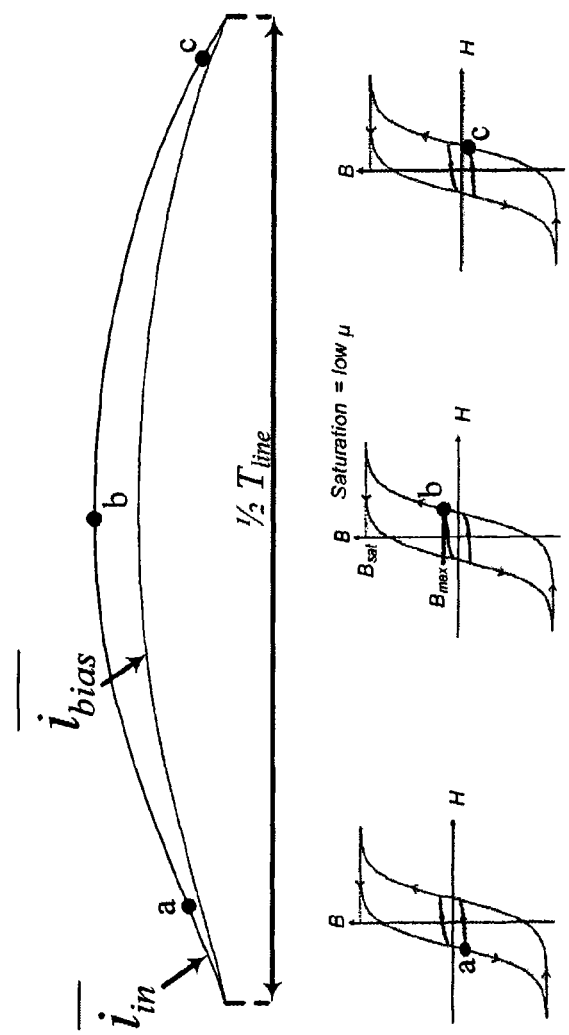
FIG. 15 is a schematic diagram of the inductor and flux cancelling bias currents and the B-H curve of the boost PFC of FIG. 12 during one half line cycle.

FIG. 15 illustrates boost inductor and flux cancelling bias currents during half line cycle along with the magnetic core operating point on the B-H curve for the rectifier 1100 implementation of FIG. 12. Comparing FIG. 15 to FIG. 13, it can be seen that the active biasing technique discussed herein results in complete cancellation of the flux component at the twice line frequency. The magnitude of the maximum flux density of the core ($B_{max}$) is therefore drastically reduced. By comparing the operating point trajectories along the B-H curve of FIG. 15 to the operating point trajectories of FIG. 13, it can be seen that the maximum flux density $B_{max}$ is drastically reduced in FIG. 15. It can also be noticed from FIG. 15 that all four (4) quadrants of the B-H curve are utilized versus only two (2) in FIG. 13. As a result, a drastic reduction in inductor volume can be achieved.

Figure 16:
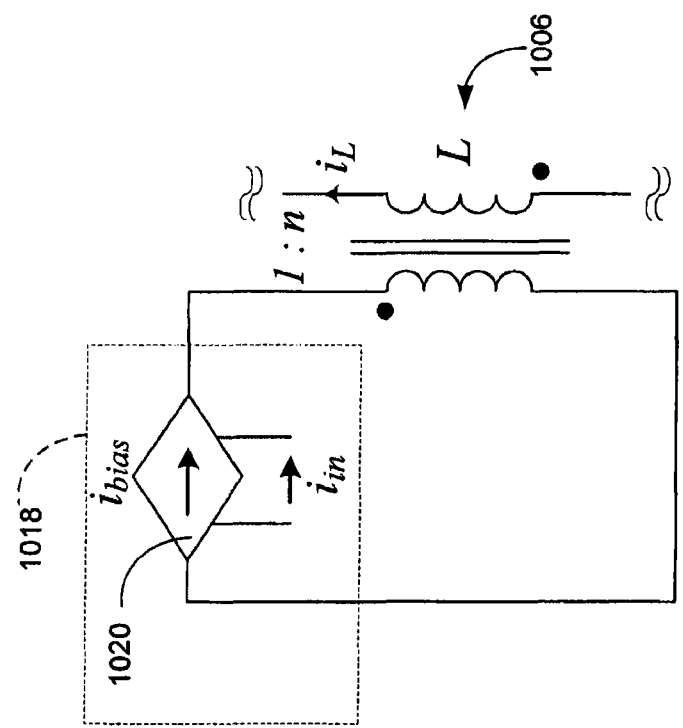
FIG. 16 is a circuit illustrating a simplified model of the controlled current source of the biasing circuit of FIG. 12.
Figure 17:
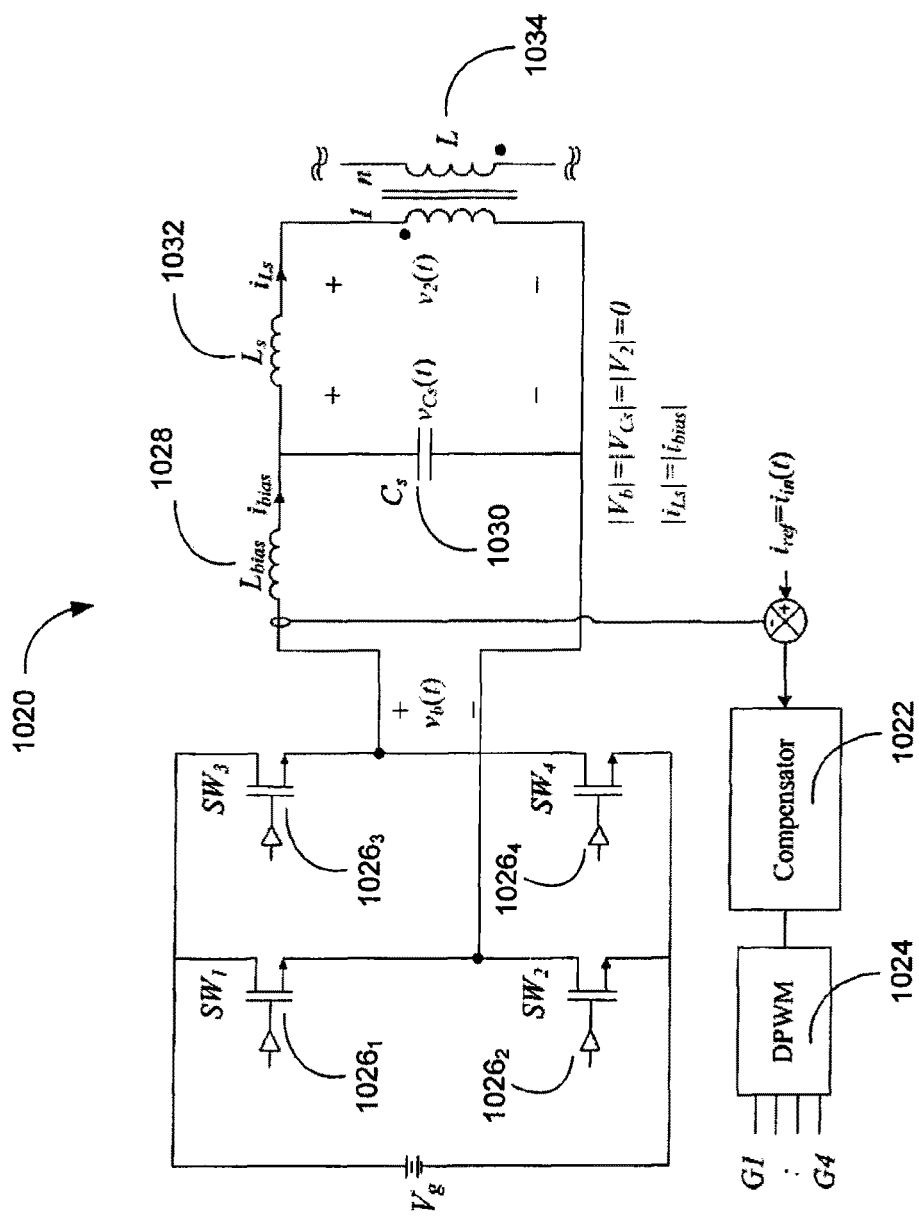
FIG. 17 is a circuit illustrating a possible implementation for the controlled current source of FIG. 16.

Operation of the biasing circuit 1018 will now be described referring to FIG. 16 and FIG. 17. The circuit 1018 behaves as a current source 1020 producing a current $i_{bias}(t)$. FIG. 17 shows a possible implementation of the current source 1020, which is based on a full bridge converter (not shown) and comprises a compensator 1022 and a DPWM 1024. The full bridge converter comprises full bridge switches $1026_1$, $1026_2$, $1026_3$, and $1026_4$, a first bias inductor 1028 having a value $L_{bias}$, a capacitor 1030 having a capacitance Cs, a second inductor 1032 having a value $L_s$, and a transformer 1034. the current source 1020 then produces the current $i_{bias}(t)=ni_{in}(t)$, where n is the conversion ratio of the transformer 1034. The operation of the converter is illustratively regulated by a current mode controller (not shown). In particular, the compensator 1022 creates the duty ratio for each one of the full bridge switches $1026_1$, $1026_2$, $1026_3$, and $1026_4$. In this manner, the current $i_{bias}$ of the bias inductor 1028 follows the current reference equal to the inductor current $i_{in}(t)$ of the boost PFC (reference 1100 in FIG. 12).

Figure 18:
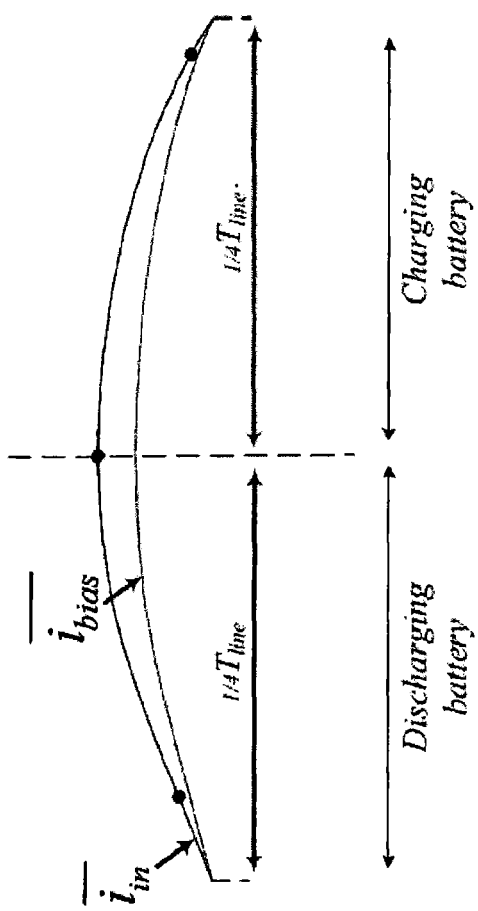
FIG. 18 is a schematic diagram of the inductor and bias currents for the controlled current source of FIG. 17.

As shown in FIG. 18, the energy provided by the input source 1020 to create the biasing current $i_{bias}$ during the first half of the period ($T_{line}/4$) will be returned to the source 1020 in the following half cycle, assuming negligible conduction losses. This can be also understood by investigating the inductor volts second balance (IVSB) equation for inductors 1028 and 1032. From the IVSB equations, we get:

$$V_{b,average}=V_{cs,average}=V_{2,average}=0. \quad (7)$$

Therefore the average energy taken from the source Vg is equal to:

$$V_{b,average}*i_{bias,average}=0 \quad (8)$$

Figure 19:
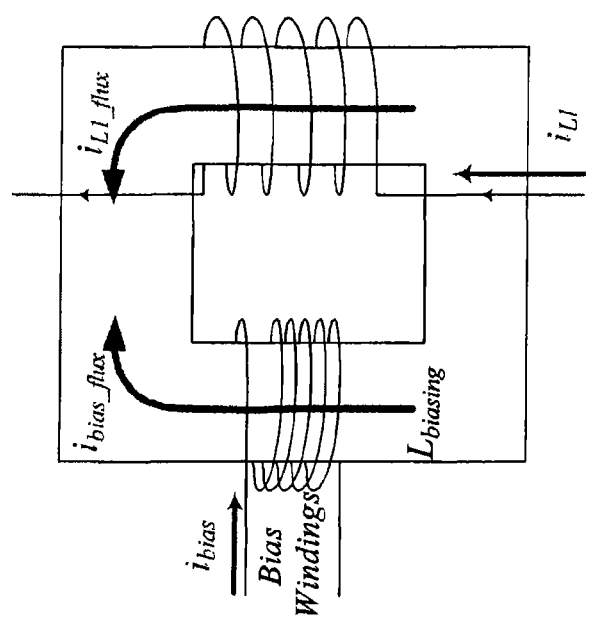
FIG. 19 is a schematic diagram of a boost PFC inductor with a second auxiliary winding for flux cancellation, in accordance with an illustrative embodiment of the present invention.

A filter (not shown) formed by the capacitor 1030 and the inductor 1032 creates a high impedance path for the high frequency current created by the switching action of the boost converter. Thus, the filter isolates the controlled current source circuit operation from the reflected voltage from the boost inductor 1032 on the secondary winding (not shown) of the transformer 1034. However the reflected impedance of the filter seen from the primary side is proportional to $n^2$ where n is the turn ratio of the primary to secondary number of turns on the magnetic core of the transformer 1034. On the other hand, the ratio of $i_{bias}/i_L$ has to be equal to n such that a flux of the opposite direction is created for proper flux cancellation, i.e. $i_{bias}=ni_L$. A possible implementation of the boost PFC inductor (reference 1006 in FIG. 12) with the second auxiliary winding (reference 1018 in FIG. 12) is shown in FIG. 19.

Figure 20:
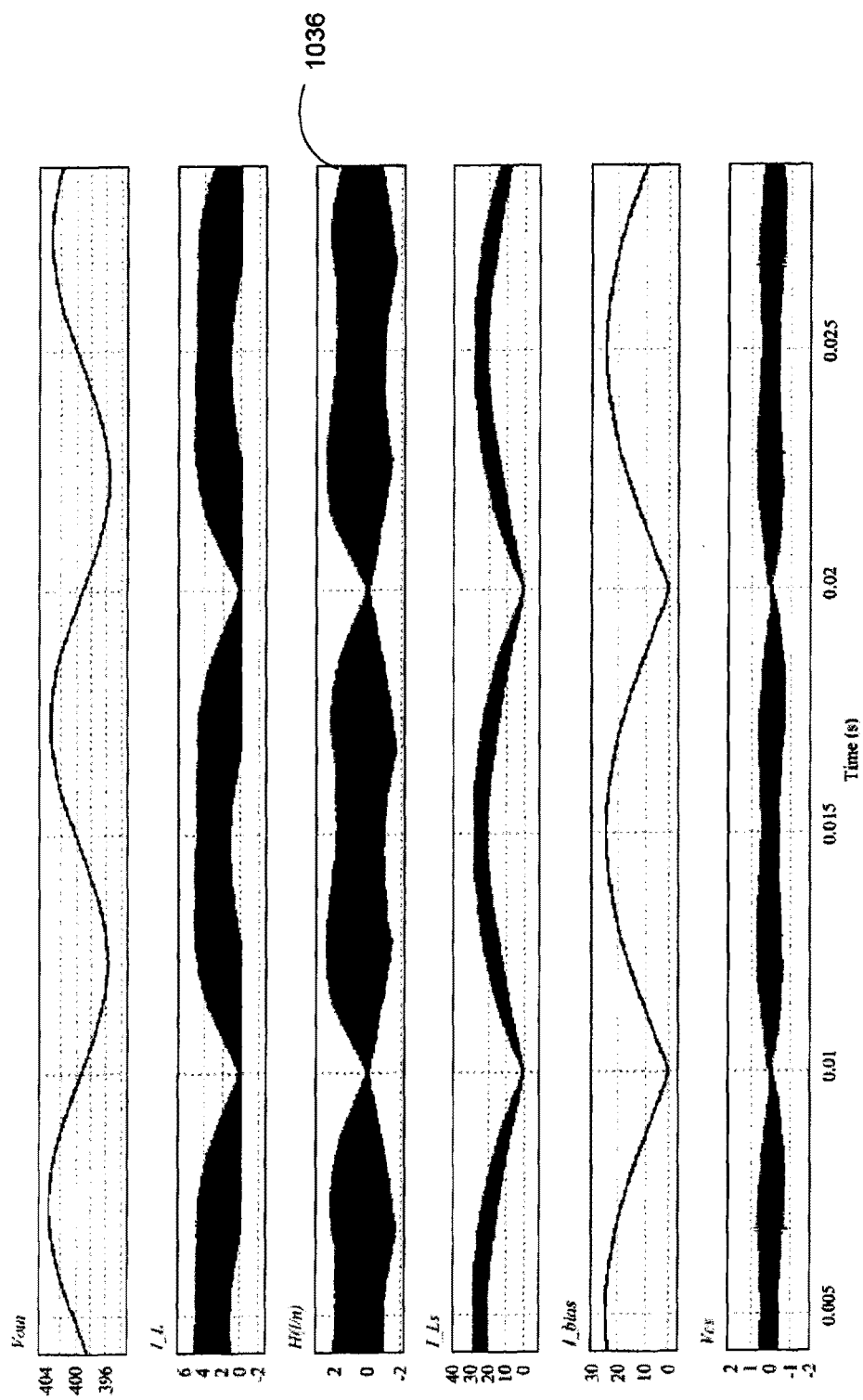
FIG. 20 shows a plot of simulation results for the controlled current source of the biasing circuit of FIG. 12.

FIG. 20 illustrates results of simulations performed for the controlled current source (reference 1020 in FIG. 16) of the flux cancellation circuit discussed above with reference to FIG. 12. These results allow to confirm proper operation and functionality of the system. Indeed, as confirmed by the H waveform 1036, the low frequency flux component at the twice line frequency is removed.

Figure 21:
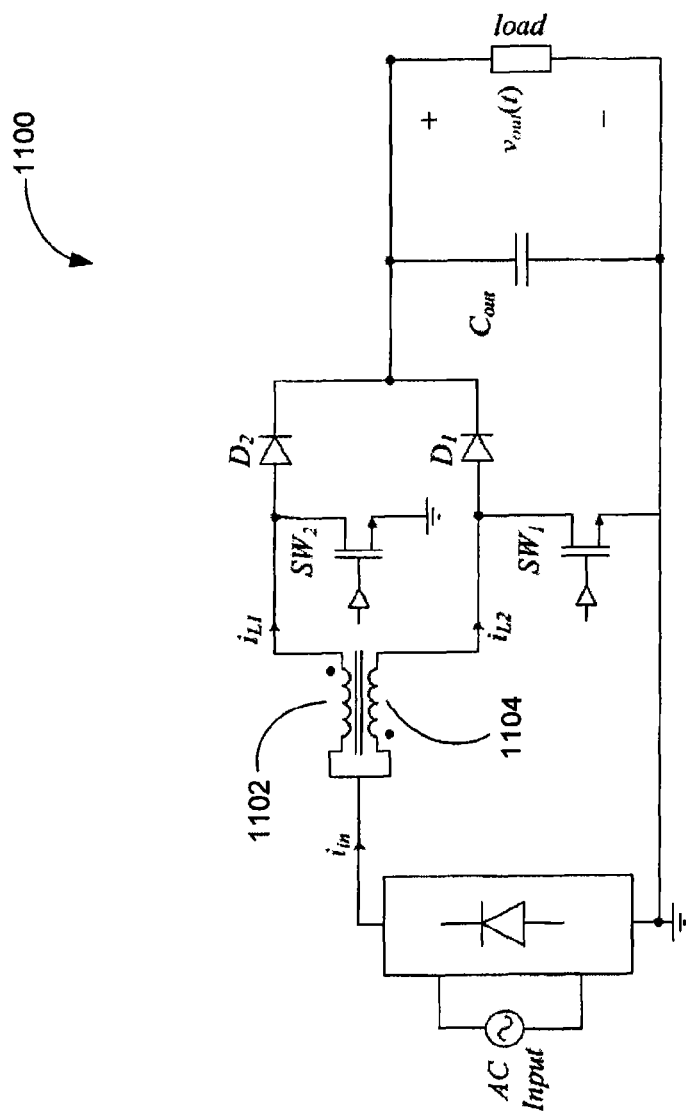
FIG. 21 is a circuit of a two-phase interleave boost PFC with inversely coupled inductors, in accordance with an illustrative embodiment of the present invention.
Figure 22:
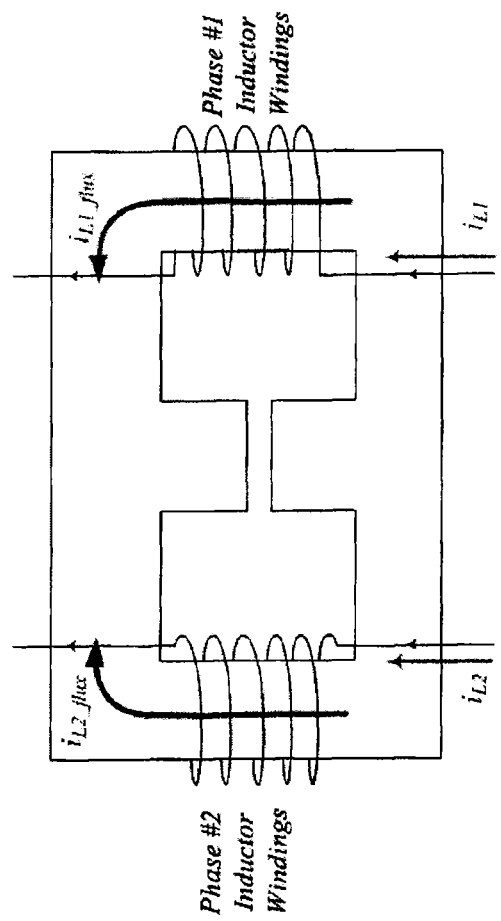
FIG. 22 is a schematic diagram of an exemplary core design for the two-phase interleave boost PFC of FIG. 21.

Referring now to FIG. 21, the low frequency flux component cancellation technique discussed above with reference to FIG. 12 may be implemented for a double-phase PFC rectifier as in 1100. For such a rectifier 1100 as well as other PFC systems having an even number of phases, the biasing circuit discussed above with reference to FIG. 12 can be eliminated. Inductors 1102 and 1104 of two phases are then wound on the same magnetic core (not shown) in opposite directions, such that fluxes are cancelled naturally. The biasing current for each boost phase is created by the current of the opposite phase and, therefore, the cancellation is achieved without any additional components/losses compared to a conventional two phase boost PFC (not shown). FIG. 22 shows a possible core design implementation for the inversely coupled inductors 1102 and 1104 of the two phase boost PFC of FIG. 21.

The embodiments of the invention described above are intended to be exemplary only. The scope of the invention is therefore intended to be limited solely by the scope of the appended claims.

The invention claimed is:

1. A system for regulating operation of a non-symmetric multi-level boost based front-end stage of a rectifier with power factor correction, the system comprising: a full-wave diode rectifier, the non-symmetric multi-level boost based front-end stage, a charge-balancing isolated downstream DC-DC stage, a controller, and an active capacitive divider coupled to an inductor of the front-end stage at a switching node for reducing a maximum voltage swing value of the inductor, wherein the controller is arranged at an output of the full-wave diode rectifier and an input of the non-symmetric multi-level boost based front-end stage, and the active capacitive divider is dimensioned and controlled ensuring that a maximum value of voltage of the switching node is always higher than an input voltage of the non-symmetric multi-level boost based front-end stage.

2. A system according to claim 1 for reducing a volume and losses of a boost inductor in a PFC rectifier, the system further comprising an auxiliary winding coupled to the inductor and a biasing circuit coupled to the auxiliary winding for providing a low frequency biasing current, thereby cancelling a flux component of the inductor at twice line frequency.

3. The system for regulating operation of a non-symmetric multi-level boost based front-end stage of a rectifier with power factor correction according to claim 1, wherein the non-symmetric multi-level boost based front-end stage and the controller produce a regulated buss voltage $V_{buss}(t)$ and the active capacitive divider is dimensioned in such a way that the maximum voltage swing value of the inductor is reduced to $V_{buss}(t)/3$.

4. The system for regulating operation of a non-symmetric multi-level boost based front-end stage of a rectifier with power factor correction according to claim 1, wherein the controller comprises first and second comparators, first and second windows based Analog-to-Digital converters, a merged multiplier and Digital-to-Analog converter and digital logic, a modes selector, and a current loop compensator.

5. A method for regulating operation of a non-symmetric multi-level boost based front-end stage of a rectifier with power factor correction using the system according to claim 1 or 3, the method comprising reducing a maximum voltage swing value of the inductor of the front-end stage using the active capacitive divider.

6. A method according to claim 5 for reducing a volume and losses of a boost inductor in a PFC rectifier, the method further comprising providing a biasing circuit and an auxiliary winding for providing a low frequency biasing current, thereby cancelling a flux component of the inductor at twice line frequency.

7. The system for regulating operation of a non-symmetric multi-level boost based front-end stage of a rectifier with power factor correction according to claim 1 or 3, wherein the charge-balancing isolated downstream DC-DC stage reduces the buss voltage to a lower value compared to a direct output of the non-symmetric multi-level boost based front-end stage.

* * * * *